United States Patent
Kishida

(10) Patent No.: US 7,170,590 B2
(45) Date of Patent: Jan. 30, 2007

(54) DISTRIBUTED OPTICAL FIBER SENSOR SYSTEM

(76) Inventor: Kinzo Kishida, c/o Neubrex Co., Ltd. 1-KIO-315, Minatojima 9-chome, Chuo-ku, Kobe-shi, Hyogo (JP) 650-0045

( * ) Notice: Subject to any disclaimer, the term of this patent is extended or adjusted under 35 U.S.C. 154(b) by 89 days.

(21) Appl. No.: 10/533,049

(22) PCT Filed: Nov. 1, 2002

(86) PCT No.: PCT/JP02/11413

§ 371 (c)(1),
(2), (4) Date: Apr. 28, 2005

(87) PCT Pub. No.: WO2004/040241

PCT Pub. Date: May 13, 2004

(65) Prior Publication Data

US 2006/0018586 A1    Jan. 26, 2006

(51) Int. Cl.
*G01B 11/16* (2006.01)

(52) U.S. Cl. .............. 356/32; 385/12; 250/227.14

(58) Field of Classification Search ............. 356/32, 356/73.1; 385/12; 250/227.14
See application file for complete search history.

(56) References Cited

U.S. PATENT DOCUMENTS 4,708,494 A    11/1987    Kleinerman
6,237,421 B1    5/2001    Li et al.

2005/0213869 A1*   9/2005   Brown et al. ............. 385/12

FOREIGN PATENT DOCUMENTS

JP    2000-074697    0/2000
JP    2001-304823    0/2001

OTHER PUBLICATIONS pp. 325-327 —"Collection of Next-Generation Optical Technologies", the first edition published on Dec. 10, 1997 —Optronics Co., Ltd.
J. Smith, A. Brown, M. DeMerchant, X. Bao —"Pulse width dependence of the Brillouin loss spectrum"—Optics Communication vol. 168 (1999), pp. 393-398.

* cited by examiner

*Primary Examiner*—Hwa Andrew Lee
(74) *Attorney, Agent, or Firm*—Gerald E. Hespos; Anthony J. Casella

(57) ABSTRACT

A distribution optical fiber sensor system measures distortion and temperature of a structure with a high spatial resolution. The system has an optical fiber on an object to be measured. A light source emits a first pulse light having a pulse width longer than a transient response of an acoustic phonon and a second pulse light after a time interval during which vibration of the acoustic phonon is maintained thereby supplying the pulse lights to the optical fiber. A detector detects scattering gain spectra of a Brillouin-scattered light created in the optical fiber by the second pulse light at intervals corresponding to twice the time obtained by equally dividing the pulse width of the second pulse light. A controlling/calculating unit calculates distortion and/or temperature based on the scattering gain spectra for sections of the optical fiber corresponding to the scattering gain spectra at the respective time intervals.

9 Claims, 19 Drawing Sheets

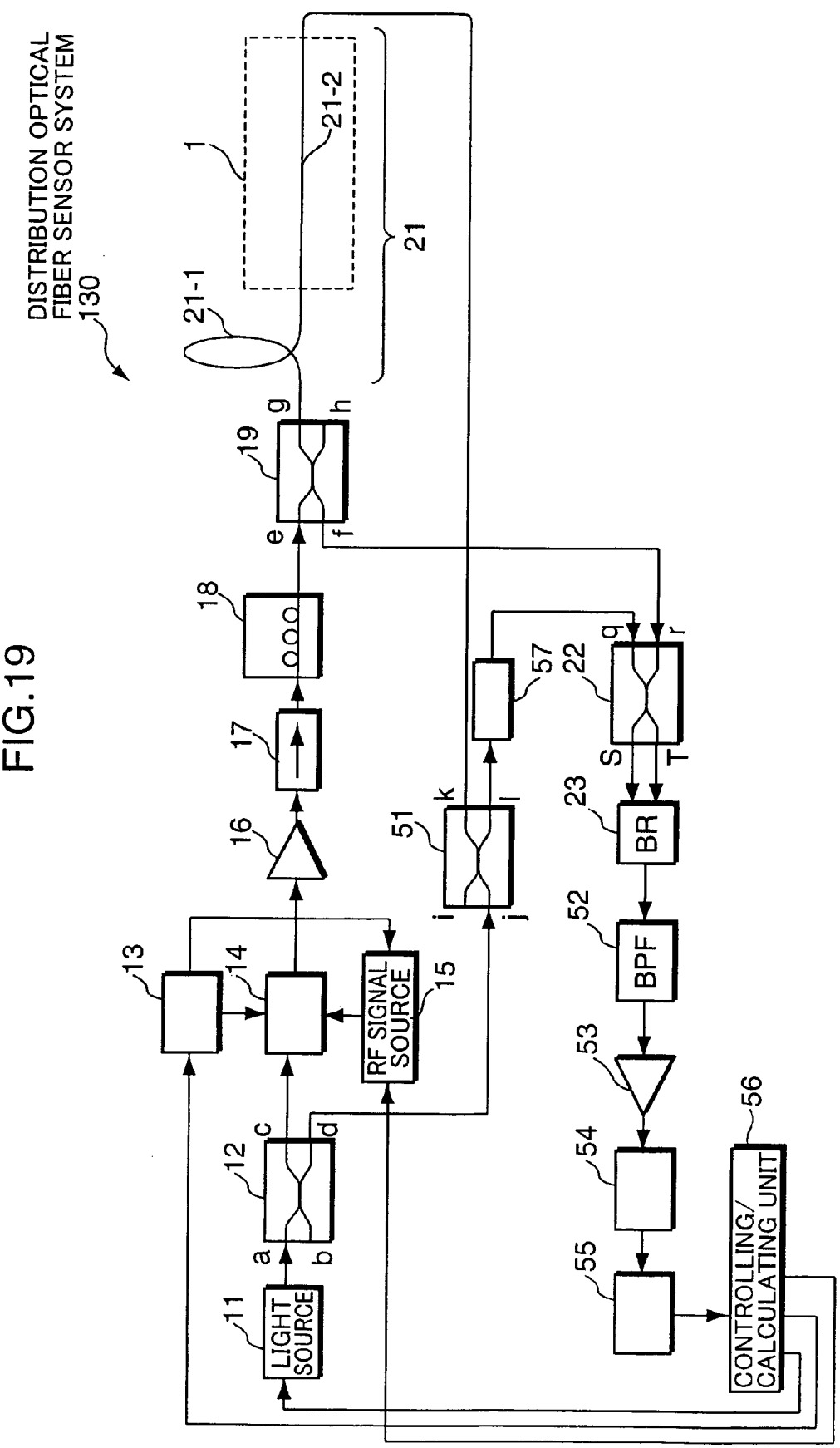

DISTRIBUTED OPTICAL FIBER SENSOR SYSTEM

TECHNICAL FIELD

The present invention relates to a distribution optical fiber sensor system capable of measuring a distortion created in a structure such as a bridge, a tunnel or a building and a temperature of such a structure with a high spatial resolution using an optical fiber in view of a transitional phenomenon.

BACKGROUND ART

There have been conventionally known distribution optical fiber sensors for measuring a distortion distribution by measuring a frequency shift amount of Brillouin scattering created in an optical fiber along an optical fiber, and those for measuring a temperature distribution by measuring a light intensity ratio of Stokes lines to anti-Stokes lines of Raman scattering created in an optical fiber. For example, they are disclosed, for example, on pp. 325 to 327 of the "Collection of Next-Generation Optical Technologies" (published by Optoronics). The spatial resolutions of these distribution optical fiber sensors have had a limit of an order of several meters due to their measuring methods.

Accordingly, an inventor of the present invention proposed a distribution optical fiber sensor system having a high spatial resolution of an order of subcentimeters in Japanese Patent Application No. H11-150618 as one of the inventors, and this application was published in Japanese Unexamined Patent Publication NO. 2000-074697.

FIG. 23 is a construction diagram of the distribution optical fiber sensor system disclosed in Japanese Unexamined Patent Publication NO. 2000-074697.

In FIG. 23, this distribution optical fiber sensor system 1000 is provided with an optical fiber 1002, a pump light source 1003, a probe light source 1004, a light intensity detector 1005, an optical coupler 1006, an optical filter 1007, a calculating means 1008, and a control means 1020.

The optical fiber 1002 as a part of a sensor for detecting a distortion and a temperature is placed on a structure 1001 as an object to be measured. A discontinuous pump light emitted from the pump light source 1003 is incident on one end of this optical fiber 1002 via the optical coupler 1006, whereas a discontinuous probe light emitted from the probe light source 1004 is incident on the other end of the optical fiber 1002. The discontinuous pump light causes various scatterings such as Brillouin scattering, Raman scattering, and Rayleigh scattering by, for example, the nonlinearity of the optical fiber 1002. The caused various scatterings amplify the discontinuous probe light if the frequencies thereof coincide with that of the discontinuous probe light, and the amplified discontinuous probe light is introduced to the optical filter 1007 by the optical coupler 1006. The optical filter 1007 mainly transmits the Brillouin-amplified discontinuous probe light (Brillouin-scattered light) from these various scattered lights. The transmitted Brillouin-scattered light has its light intensity detected by the light intensity detector 1005, and a detection result is outputted to the calculating means 1008. The control means 1020 sets the frequency of the discontinuous probe light, controls the emissions of the probe light source 1004 and the pump light source 1003 so that the discontinuous probe light and the discontinuous pump light overlap at a measuring position on the structure 1001, controls a sampling timing in the light intensity detector 1005 so that the Brillouin-scattered light created as a result of interaction can be detected, etc.

The calculating means 1008 calculates the distortion and the temperature of the optical fiber 1002 based on the detection result of the light intensity detector 1005. In this calculation, the distribution optical fiber sensor system 1000 has achieved a high spatial resolution by dividing an overlapping section where the discontinuous probe light and the discontinuous pump light overlap into a plurality of small sections.

Since an acoustic phonon as a cause of Brillouin scattering is a mechanical propagation, it cannot momentarily start vibration and a transient phenomenon is known to exist (J. Smith, A. Brown, M. DeMerchant, X. Bao, "Pulse width dependence of the Brillouin loss spectrum", Optical Communication Vol. 168 (1999), pp. 393–398). Thus, in order to more precisely measure a distortion and a temperature taking advantage of Brillouin scattering, this transient phenomenon needs to be considered.

In view of the above problems residing in the prior art, an object of the present invention is to provide a distribution optical fiber sensor system having a high spatial resolution and taking a transient phenomenon into account by using a first and a second pump lights having different frequencies.

SUMMARY OF THE INVENTION

In order to accomplish the above object, the present invention is directed to a distribution optical fiber sensor system, comprising an optical fiber for sensing to be placed on an object to be measured; a light source for emitting a first pulse light having a pulse width longer than a transient response of an acoustic phonon and emitting a second pulse light in succession to the first pulse after a time interval during which the vibration of the acoustic phonon is substantially maintained to supply the first and second pulse lights to the optical fiber; a detector for detecting a scattering gain spectrum of a Brillouin-scattered light created in the optical fiber by the second pulse light at time intervals corresponding to twice the time obtained by equally dividing the pulse width of the second pulse light; and a calculator for calculating a distortion and/or a temperature based on the respective scattering gain spectra at the respective time intervals for small sections of the optical fiber corresponding to the respective scattering gain spectra at the respective time intervals.

These and other objects, features, aspects, and advantages of the present invention will become more apparent from the following detailed description of the preferred embodiments/examples with reference to the accompanying drawings.

BRIEF DESCRIPTION OF THE DRAWINGS

FIG. 19 is a diagram showing a construction of a distribution optical fiber sensor system according to a fourth embodiment.

DETAILED DESCRIPTION OF THE PREFERRED EMBODIMENTS OF THE INVENTION

Figure 1:
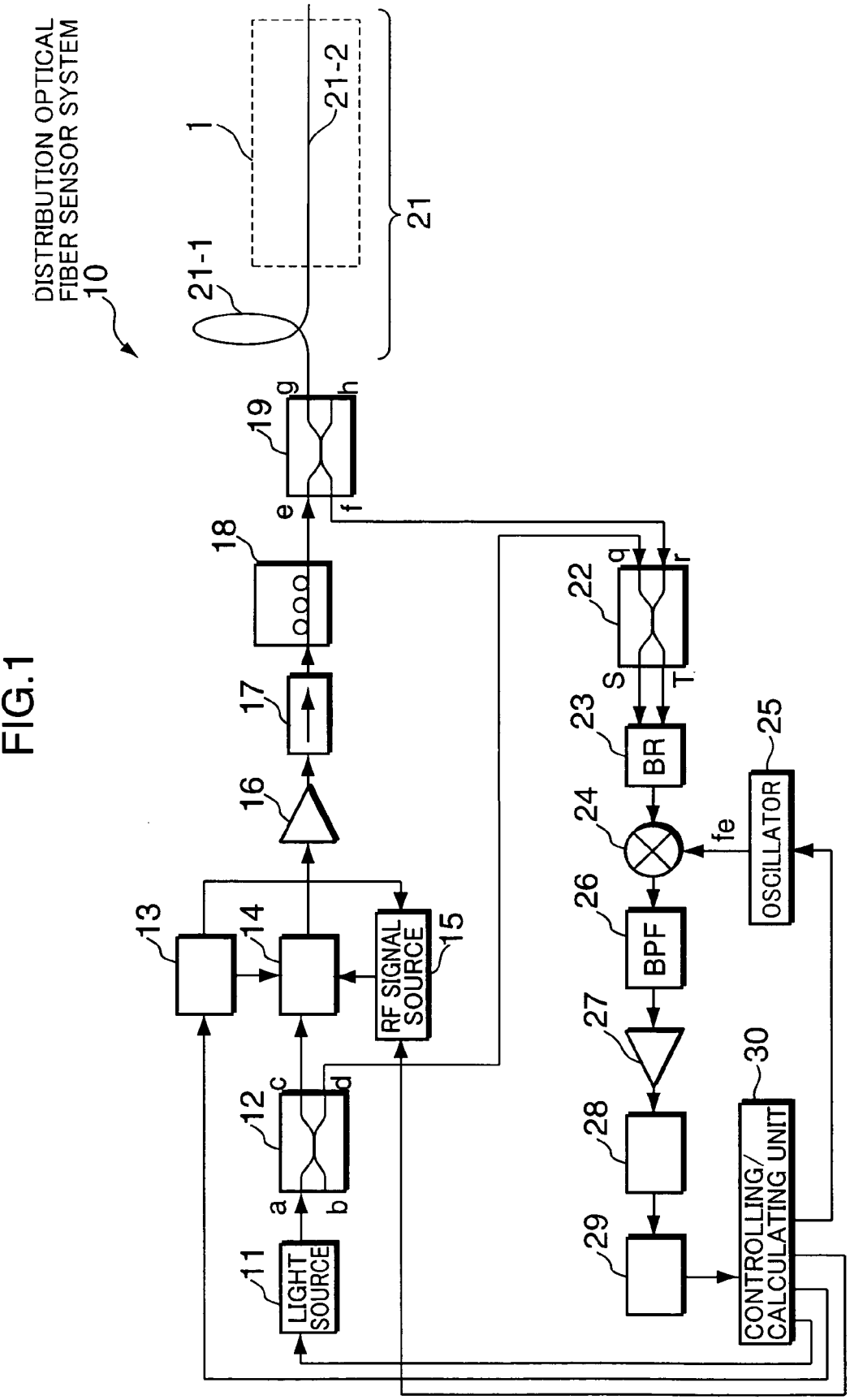
FIG. 1 is a diagram showing a construction of a distribution optical fiber sensor system according to a first embodiment.

Hereinafter, embodiments of the present invention are described with reference to the accompanying drawings. In the respective figures, the same constructions are identified by the same reference numerals and no repetitive description is given.

(Construction of First Embodiment)

FIG. 1 is a diagram showing a construction of a distribution optical fiber sensor system according to a first embodiment.

In FIG. 1, a distribution optical fiber sensor system 10 of the first embodiment is provided with a light source 11, optical couplers 12, 19, 22, a controller 13, a light frequency converter 14, an RF signal source 15, a light amplifier 16, an optical isolator 17, a polarization controller 18, an optical fiber 21, a light receiver 23, a mixer 24, an oscillator 25, a band-pass filter (BPF) 26, an amplifier 27, an analog-to-digital (A/D) converter 28, a buffer 29 and a controlling/calculating unit 30.

The light source 11 feeds a light of a spectral line narrower than the line width of a Brillouin scattered light to the optical fiber 21 under the control of the controlling/calculating unit 30 in order to measure a distortion and/or a temperature. For example, various semiconductor lasers such as a distribution feedback semiconductor laser and a distribution Bragg reflection semiconductor laser can be used as the light source 1. In this embodiment, a semiconductor laser for emitting a CW light having a wavelength of 1550 nm (frequency at this wavelength is f0) is used. The optical couplers 12, 19, 22 are parts for coupling and branching off incident lights and outputting the branched-off lights. An optical circulator may be used as the optical coupler 19.

The RF signal source 15 generates an electrical signal having a radio frequency under the control of the controlling/calculating unit 30. The light frequency converter 14 is a part for converting the frequency (wavelength) of the incident light into a specified frequency and is, for example, a SSB (single side band)-LN light modulator for converting the frequency of the incident light in accordance with the frequency of the electrical signal fed from the RF signal source 15 in this embodiment. The controller 13 controls the light frequency converter 14 and the RF signal source 15 under the control of the controlling/calculating unit 30 to cause the light frequency converter 14 to output its incident light of a specified frequency during a specified period at a specified timing. The light amplifier 16 is a part for amplifying the incident light up to a specified light intensity. For example, an optical fiber amplifier added with a rare-earth element in conformity with the wavelength of an incident light to be amplified is used as such. In the case of amplifying a light within a wavelength band of 1500 nm, erbium (atomic number: 68) is used as the rare-earth element. The optical isolator 17 is a part designed to transmit a light only in one direction.

The polarization controller 18 is a part for outputting the incident light after converting a polarizing surface of the incident light into a specific polarizing surface under the control of the controlling/calculating unit 30. The optical fiber 21 is divided into a reference light fiber portion 21-1 and a detection light fiber portion 212-2 and is, for example, a quartz optical fiber. The reference light fiber portion 21-1 is not fixed to an object to be measured, whereas the detection light fiber portion 21-2 is fixed inside a structure (object to be measured) 1 such as a bridge, a tunnel or a building or fixed to the outer surface thereof. In the case of measuring only a temperature without measuring a distortion, the detection light fiber portion 21-2 needs not necessarily be fixed.

The light receiver 23 is a part for detecting the light intensity of the incident light and converting the detected light intensity into an electrical signal of an intensity corresponding to the received light intensity. The mixer 24 multiplexes a plurality of inputted electrical signals and outputs the resulting signal. The oscillator 25 oscillates an electrical signal having a specified frequency f1 under the control of the controlling/calculating unit 30. The BPF 26 is a filter for transmitting only lights within a specified frequency band. The amplifier 27 amplifies the inputted signal to have a specified amplitude. The A/D converter 28 converts an analog signal into a digital signal. The buffer 29 temporarily saves an output of the A/D converter 28. The controlling/calculating unit 30 is a part for controlling the respective parts of the distribution optical fiber sensor system 10 and calculating the distortion and the temperature with a high spatial resolution as described later and is, for example, a personal computer including a microprocessor.

Next, the operation of the distribution optical fiber sensor system 10 according to the first embodiment is described.

Operation of the First Embodiment)

First, how a CW laser beam emitted from the light source 11 acts in the distribution optical fiber sensor system 10 is described.

The CW laser beam having a frequency f0 and emitted from the light source 11 is incident on a port "a" of the optical coupler 12 and distributed into two laser beams. One distributed laser beam is outputted from a port "d" and incident on a port "q" of the optical coupler 22. The other laser beam is outputted from a port "c" and incident on the light frequency converter 14. The incident laser beam has the frequency thereof adjusted to a specified frequency in the light frequency converter 14 in accordance with the radio frequency of the RF signal source 15 and an output period of the light frequency converter 14 adjusted by the controller 13.

Figure 2:
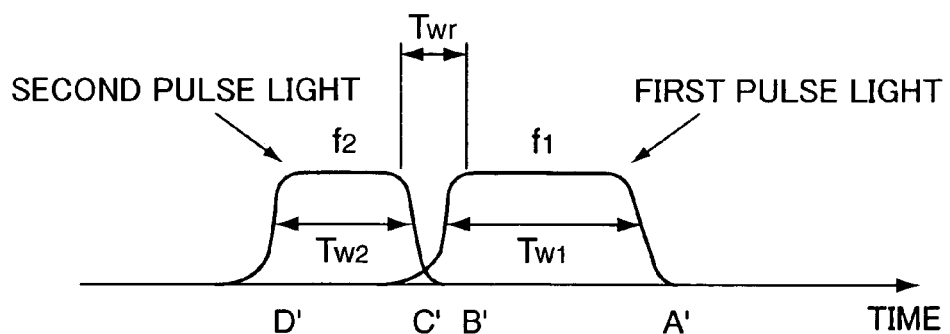
FIG. 2 is a graph showing a pump light outputted from an optical frequency converter.

FIG. 2 is a graph showing a pump light outputted from the light frequency converter, wherein a horizontal axis represents time and a vertical axis represents light intensity.

The CW laser beam incident on the light frequency converter 14 from the optical coupler 12 is converted into a first pulse light having a pulse width Tw1 and a second pulse light having a pulse width Tw2 in accordance with a control signal from the controller 13 and the radio frequency of the RF signal source 15. Since the first pulse light is a pulse for starting and stabilizing the vibration of an acoustic phonon, the pulse width Tw1 thereof needs to be a duration sufficiently long to end a transient response. A period of duration of the transient response changes according to the material of the optical fiber and the light intensity of the pulse, but is normally about 20 ns. Accordingly, the pulse width Tw1 is set, for example, at 100 ns with a margin in this embodiment. Since the second pulse light is a pulse used to measure the distortion and the temperature, the pulse width Tw2 thereof is a duration necessary for the measurement (Tw2=dt×m) and set, for example, at 30 ns in this embodiment. An interval Twr between the first and second pulse lights is a duration necessary to change from the frequency of the first pulse light to that of the second pulse light and mainly depends on the performances of the controller 13, the light frequency converter 14 and the RF signal source. Since the vibration of the acoustic phonon starts being attenuated upon the end of the first pulse light, the interval Twr is preferably as short as possible and set, for example, at 2 ns in this embodiment. Since there is substantially no attenuation of the acoustic phonon at 2 ns, the interval Twr substantially gives no influence on the measurements of the distortion and the temperature.

The frequency f1 of the first pulse light and the frequency f2 of the second pulse light are set at such values that substantially similar acoustic phonons are created in the optical fiber 21 and the first and second pulse lights can be efficiently filtered by the BPF 26 as a result of being multiplexed with an electrical signal having a frequency fe of the oscillator 25 in the mixer 24. For example, in this embodiment, the frequency f1 of the first pulse light is set at 12 GHz and the frequency f2 of the second pulse light is set at 10.8 GHz.

The first and second pulse lights outputted from the light frequency converter 14 are amplified in the light amplifier 16 to such an extent as to bring about a nonlinear optical effect sufficient to measure the distortion and the temperature in the detection light fiber portion 21-2 in view of losses and connection losses in the optical isolator 17, the polarization controller 18, the optical couplers 19, 22 and the optical fiber 21. In this embodiment, an output of the light amplifier 16 is to a maximum of 20 dBm.

The amplified first and second pulse lights have the polarizing surfaces thereof adjusted in the polarization controller 18 via the optical isolator 17, and are incident on one port "e" of the optical coupler 19. The first and second pulse lights outputted from a port "g" of the optical coupler 19 are incident on the optical fiber 21.

Figure 3:
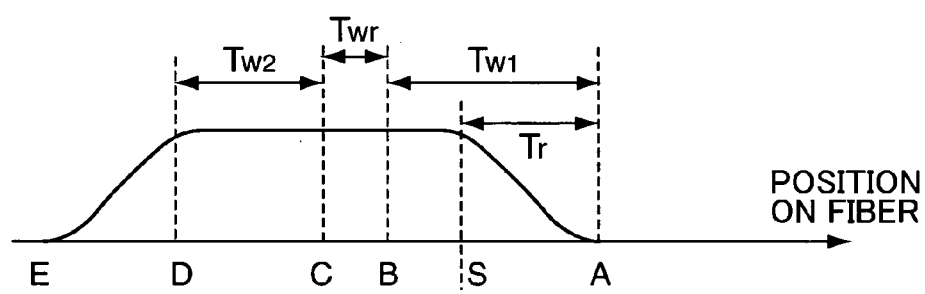
FIG. 3 is a graph showing states of acoustic phonons by a first pulse light and a second pulse light.

FIG. 3 is a graph showing states of acoustic phonons by the first and second pulse lights, wherein a horizontal axis represents positions on the optical fiber 21. Points A, B, C and D in FIG. 3 correspond to points A', B', C' and D' shown in FIG. 2.

In the optical fiber 21, the acoustic phonons shown in FIG. 3 are created by the first and second pulse lights. Upon reaching a starting point A' of the first pulse light, the vibration is started in the optical fiber 21 (point A), but the acoustic phonon gradually rises as shown in FIG. 3 (point A to point S) without being able to momentarily rise. This transient response is about 20 ns as mentioned above. Upon the passage of 60 ns which is three times as much (point S), the acoustic phonon is thought to reach a sufficiently stable state. Thereafter, the stable state continues up to an arrival of an ending point B' of the first pulse light (point S to point B). Although there is no light during the interval Twr between the end of the first pulse light and the start of the second pulse light, the acoustic phonon keeps its state due to inertia (point B to point C) since this interval Twr is short. Thereafter, a starting point C' of the second pulse light is reached. Since the acoustic phonon already vibrates in a stable state, a stable acoustic phonon is created from the beginning on by the second pulse light without any transient response. Thus, Brillouin scattering by the second pulse light stably occurs. It should be noted that the first and second pulse lights create substantially the same acoustic phonons. This stable state continues (point C to point D) until an ending pint D' of the second pulse light is reached. Upon the end of the second pulse light, the acoustic phonon is gradually attenuated to return to a ground state (point D to point E). In order to keep the stable acoustic phonon at point D as well, a third pulse having a frequency different from that of the second pulse may be incident on the optical fiber 21 after a specified time interval following the end of the second pulse light.

The Brillouin-scattered light created by the acoustic phonons in the optical fiber 21 is incident on the port "g" of the optical coupler 19 and outputted from a port "f". The Brillouin-scattered light outputted from the port "f" is incident on a port "r" of the optical coupler 22. The CW pump light incident on the port "q" and the Brillouin-scattered light incident on the port "r" are coupled in the optical coupler 22 and distributed into two lights.

Figure 4:
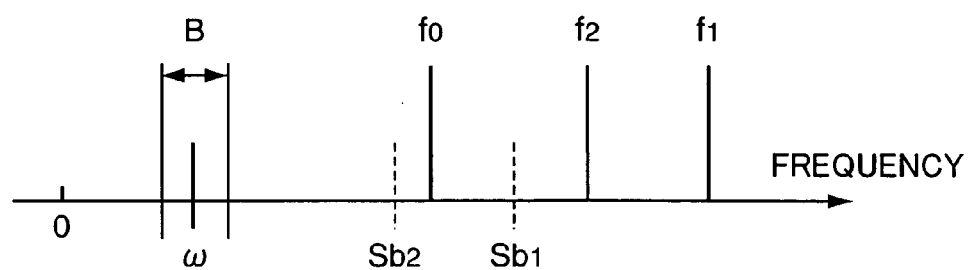
FIG. 4 is a graph showing a frequency relationship of the respective lights.

FIG. 4 is a graph showing a frequency relationship of the respective lights, wherein a horizontal axis represents frequency and a vertical axis represent intensity. Since FIG. 4 only shows a mutual relationship of the frequencies of the respective lights, the intensities of the respective lights differ from actual ones.

In FIG. 4, identified by frequency f0 is the CW pump light, by frequency f1 the first pulse light, and by frequency f2 the second pulse light. A frequency Sb1 is a frequency of the Brillouin-scattered light created by the first pulse light, whereas a frequency Sb2 is a frequency of the Brillouin-scattered light created by the second pulse light. A relationship: f1−Sb1=f2−Sb2=fB, holds. A band width B is a frequency band of the light receiver 23, and ω denotes a center frequency of the light receiver 23 and is B/2 in this embodiment. Anti-stokes lines of the Brillouin-scattered light and Raman-scattered light are not shown in FIG. 4 since they are irrelevant to the following description.

Here, in the case of using an optical fiber of 10.5 GHz, the following relationships hold: f1−f0=12 GHz, f2−f0=10.8 GHz (corresponding to Rayleigh-scattered light), f1−f0−fB=1.5 GHz, f2−f0−fB=0.3 GHz (300 MHz) by the interference (multiplexing) in the optical coupler 22. Thus, if the band width B is selected to be 600 MHz or shorter, only the Brillouin-scattered light by the second pulse light can be outputted from the light receiver 23. In this way, in this embodiment, an output corresponding to the Brillouin-scattered light by the second pulse light is obtained by the light receiver 23 by causing the CW laser beam from the light source 11 to interact in the optical coupler 22 and suitably selecting the band width B of the light receiver 23. If an absolute value of a variable x is expressed by abs[x], the band width B of the light receiver 23 may be so set as to hold the following relationship (1).

$$abs[f1-f0-fB] \gg B > abs[f2-f0-fB] \quad (1).$$

The distributed lights are inputted to the light receiver 23 to be photoelectrically converted. In order to cancel a noise created in the light source 11, a balanced receiver (BR) is, for example, used as the light receiver 23 in this embodiment. An output of the light receiver 23 is multiplexed with a sinusoidal electrical signal having the frequency fe and inputted from the oscillator 25 in the mixer 24, and inputted to the BPF 26. For example, in this embodiment, the frequency fe is set at 1.3 GHz, and the transmission characteristic of the BPF 26 is set such that a center frequency ωe is 1.0 GHz and a transmission frequency range is 1 MHz.

An output of the BPF 26 is amplified to a specified level and converted from an analog signal into a digital signal in the A/D converter 28. The resulting digital signal is squared for the conversion into a light intensity Ps(t) corresponding to the Brillouin-scattered light.

Here, in the aforementioned case, a signal by the Brillouin-scattered light can be recorded even at abs[fe−ω]=1.0 GHz if a sampling rate of the A/D converter 28 is set at 5 GS.

It should be noted that "s" in Ps(t) denotes frequency and is Sb2 in FIG. 4. In this embodiment, $$s = Sb2 \quad (2)$$
$$= (f2 - fB) - f0 + fe$$

Ps(t) is inputted to the buffer 29 to be temporarily saved there.

Figure 5:
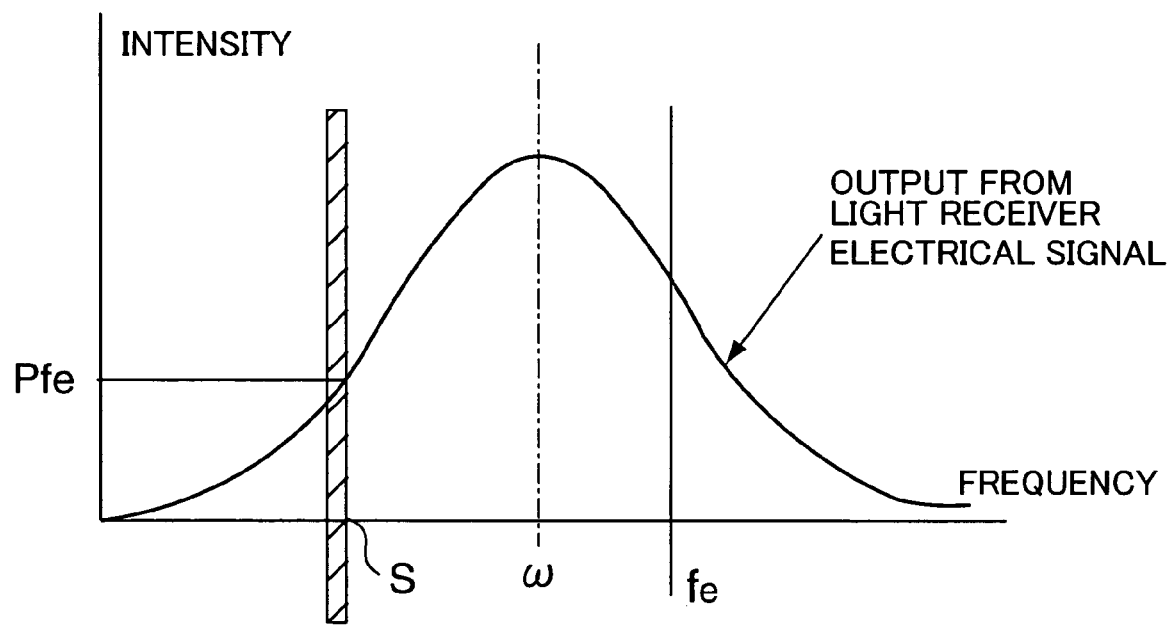
FIG. 5 is a graph showing a relationship between the frequency of an oscillator and a spectrum of a Brillouin-scattered light.

In this way, a spectrum Pfe corresponding to the frequency s shown by hatching in FIG. 5 can be obtained. FIG. 5 is a graph showing a relationship between the frequency of the oscillator and the spectra of the Brillouin-scattered light, wherein a horizontal axis represents frequency and a vertical axis represent the intensity of the Brillouin-scattered light.

In this embodiment, dt=1 ns since being adjusted to RF amplitude of 1 GHz. Thus, Ps(t) represents the light intensity of the Brillouin-scattered light created while the second pulse light propagates in the optical fiber 21 only for 1 ns. On the other hand, since the second pulse light propagates at a speed V of 200 nm/ns for 1 ns, a propagation distance thereof in the optical fiber 21 is: dz=dt×V/2=10 cm. As a result, Ps(t) represents the light intensity of the Brillouin-scattered light every 10 cm in the optical fiber 21.

Accordingly, if a calculation is made as described later using Ps(t), the distortion and the temperature of the optical fiber 21 can be measured with a spatial resolution of 10 cm in this embodiment.

Figure 6:
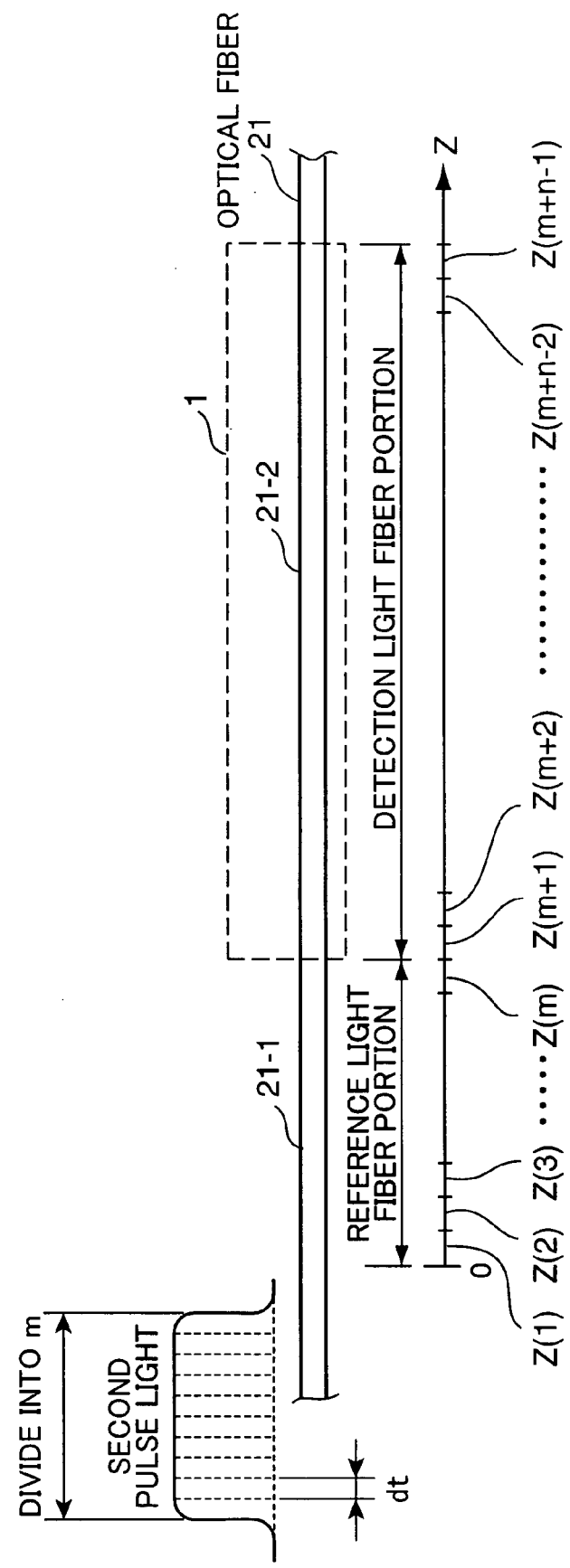
FIG. 6 is a diagram showing a relationship between virtual small spaces and an optical fiber.

Next, a method for calculating the distortion and the temperature is described. FIG. 6 is a diagram showing virtual small spaces and the optical fiber.

In FIG. 6, Z-axis having an origin at the starting point of the reference light fiber portion 21-1 is set along the longitudinal direction of the optical fiber 21. The reference light fiber portion 21-1 is divided into m small spaces, and the detection light fiber portion 21-2 is divided into (n−1) small spaces. Further, the second pulse light is thought to be virtually divided into m sections at very short time intervals dt. In this embodiment, the length of the small spaces is 10 cm as described above. In this case, a Brillouin scattering gain matrix is expressed as in equation (3) below.

$$\begin{pmatrix} a(1,1) & a(1,2) & \ldots & a(1,m) & 0 & \ldots & \ldots & \ldots & 0 \\ 0 & a(2,2) & a(2,3) & \ldots & a(2,m+1) & \ldots & \ldots & \ldots & 0 \\ \vdots & & \ddots & & & & & & \vdots \\ 0 & \ldots & a(i,i) & a(i,i+1) & \ldots & a(i,i+n-1) & 0 & \ldots & 0 \\ \vdots & & & \ddots & & & & & \vdots \\ 0 & \ldots & & a(n,n) & a(n,n+1) & \ldots & \ldots & \ldots & a(n,m+n-1) \end{pmatrix} \quad (3)$$

$$\begin{pmatrix} gs(1) \\ gs(2) \\ \vdots \\ gs(i) \\ \vdots \\ gs(m) \\ \vdots \\ gs(m+n-1) \end{pmatrix} = \begin{pmatrix} Qs(1) \\ Qs(2) \\ \vdots \\ Qs(i) \\ \vdots \\ Qs(n) \end{pmatrix}$$

Here, $Qs(i)$ (i: integer $1 \leq i \leq n$) are variables determined by the light intensities of the Brillouin-scattered light in a plurality of small spaces $z(i)$ to $z(i+n-1)$ shown in FIG. 6 at the set frequency f2 of the second pulse light and by the light intensity of the second pulse light incident on the optical fiber 21; $gs(j)$ is a scattering gain coefficient of the j-th small space $z(j)$ corresponding to the frequency s; and $a(i, j)$ is a contribution ratio of the light intensity of the Brillouin-scattered light in the j-th small space $z(j)$ (j=i to (i+m−1)) to the variable $Qs(i)$.

$Qs(i)$ is expressed as in equation (4) in view of the light intensity of the Brillouin-scattered light by the second pulse light and a propagation loss of the second pulse light in the optical fiber 21:

$$Qs(i) = lnPs(ti) + \alpha L - \eta \quad (4)$$

where $\alpha$ and L denote an attenuation coefficient of the optical fiber 21 and the length of the optical fiber 21. $\eta$ is a constant, but may be set at 0 for the simplicity.

When the frequency fe of the oscillator 25 is scanned at intervals of 5 MHz, time domain spectra of the Brillouin-scattered light can be measured.

Further, if $a(i, j)$ obtained in a certain section i using equations (3), (4) is expressed by a frequency axis, the scattering gain spectrum in this section i can be obtained.

Figure 7:
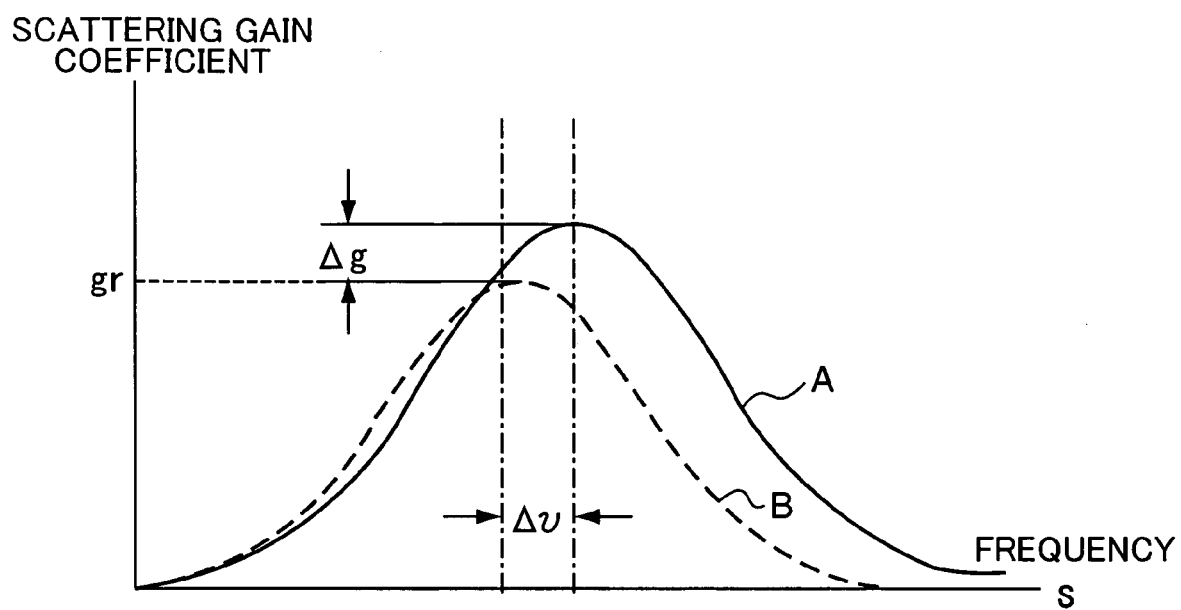
FIG. 7 is a graph showing scattering gain spectra.

FIG. 7 is a graph showing scattering gain spectra, wherein a horizontal axis represents frequency and a vertical axis represents scattering gain coefficient. A solid-lined curve in FIG. 7 represents a measured scattering gain spectrum A, whereas a broken-lined curve in FIG. 7 is a scattering gain spectrum B in the reference light fiber portion 21-1. $\Delta g$ is a difference between a maximum value of the measured scattering gain spectrum A and a maximum value of the scattering gain spectrum B in the reference light fiber portion 21-1, and $\Delta v$ is a difference between a frequency giving the maximum value of the measured scattering gain spectrum A and a frequency giving the maximum value of the scattering gain spectrum B in the reference light fiber portion 21-1.

Equation (5) is known to hold if $\epsilon i$, $Ti$, $\epsilon r$, $Tr$ denote the distortion and the temperature in the section i and the distortion and the temperature of the reference light fiber portion 21-1, respectively.

$$\begin{pmatrix} \Delta v \\ \frac{\Delta g}{g_r} \end{pmatrix} = \begin{pmatrix} C\epsilon v & CTv \\ C\epsilon P & CTP \end{pmatrix} \begin{pmatrix} \Delta \epsilon \\ \Delta T \end{pmatrix} \quad (5)$$

Here, $\Delta \epsilon = \epsilon r - \epsilon i$; $\Delta T = Tr - Ti$; gr is a maximum gain coefficient of the reference light fiber portion 21-1; $C\epsilon v$, $C\epsilon P$, $CTv$ and $CTP$ are constants peculiar to the optical fibers 21.

In this way, the measurement results can be put into equations (3), (4) to obtain the scattering gain coefficient shift $\Delta g$ and the frequency shift $\Delta v$ shown in FIG. 7, and the distortion $\epsilon i = \epsilon r + \Delta \epsilon$ and the temperature $Ti = Tr + \Delta T$ in the small spaces $z(i)$ can be calculated using equation (5).

Next, operations in the case of actually measuring the distortion and the temperature using the distribution optical fiber sensor system 10 are described.

Figure 8:
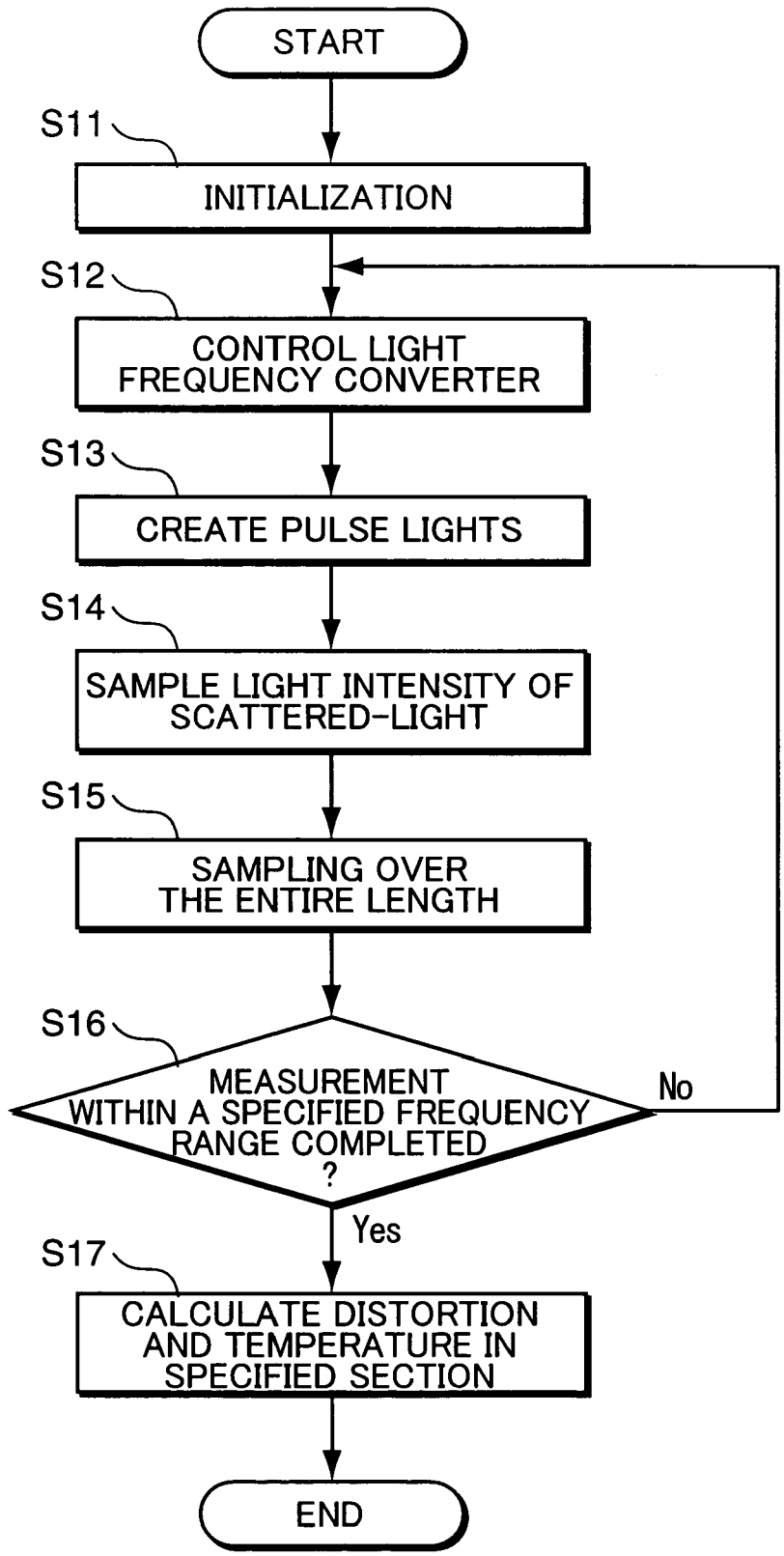
FIG. 8 is a flowchart showing operations of the distribution optical fiber sensor system according to the first embodiment.

FIG. 8 is a flowchart showing operations of the distribution optical fiber sensor system according to the first embodiment.

First, the controlling/calculating unit 30 performs initial settings by initializing the respective devices and causing the RF signal source 15 and the oscillator 25 to operate (Step S11). Subsequently, the controlling/calculating unit 30 controls the controller 13 so that the aforementioned first and second pulse lights can be outputted from the light frequency converter 14 (Step S12). The controlling/calculating unit 30 then drives the light source 11 to cause it to emit a CW laser beam. The emitted CW laser beam is caused to emerge out as the first and second pulse lights from the light frequency converter 14 by the controller 13 and the RF signal source 15 as described above (Step S13). The outputted first and second pulse lights act as described above in the respective devices, and the Brillouin-scattered light by the second pulse light is sampled (Step S14). Subsequently, the Brillouin-scattered light is sampled over a specified period to perform sampling over the entire length of the detection light fiber portion 21-2 (Step S15). If L denotes the entire length of the optical fiber 21, the specified period is 2L/V since it is a time for the light to propagate back and forth in the optical fiber 21.

Next, the controlling/calculating unit 30 repeats Steps S12 to S15 (Step S16) while shifting the frequency fe of the oscillator 25 by a specified amount within a frequency range where the Brillouin-scattered light is predicted to be created (Step S16). In this way, data used to obtain the measured scattering gain spectrum A shown in FIG. 7 is obtained in every small space of the optical fiber 21.

Here, in order to suppress the influence of the polarization, the controlling/calculating unit 30 may repeat Steps S12 to S16 while rotating the polarizing surfaces of the first and second pulse lights by a specified angle by controlling the polarization controller 18, thereby obtaining average data used to obtain the measured scattering gain spectrum A shown in FIG. 7. Since this averages the polarization effect in the optical fiber 21 and enables a more precise characteristic curve C to be obtained, the distortion can be more precisely measured.

Next, the controlling/calculating unit 30 calculates the distortion and the temperature in each small space with a high spatial resolution using the data saved in the buffer 29 in accordance with the aforementioned equations (3) to (5) (Step S17).

As described above, since the distribution optical fiber sensor system 10 of this embodiment virtually divides the optical fiber 21 into the small spaces and calculates the distortion and the temperature based on the Brillouin-scattered light in each small space, the distortion and the temperature can be measured with a higher spatial resolution as compared to conventional distribution optical fiber sensor systems. The spatial resolution of this embodiment is determined by the speed of the light in the optical fiber and the sampling rate. Since the distribution optical fiber sensor system 10 of this embodiment causes the propagation of the second pulse light for creating the Brillouin-scattered light for measurement after causing the propagation of the first pulse light, no transient phenomenon occurs in the Brillouin-scattered light for measurement. Therefore, the distortion and the temperature can be more precisely measured.

Here, a technique of measuring the distortion and the temperature with a higher resolution by improving Step S17 of the first embodiment is described.

Figure 9:
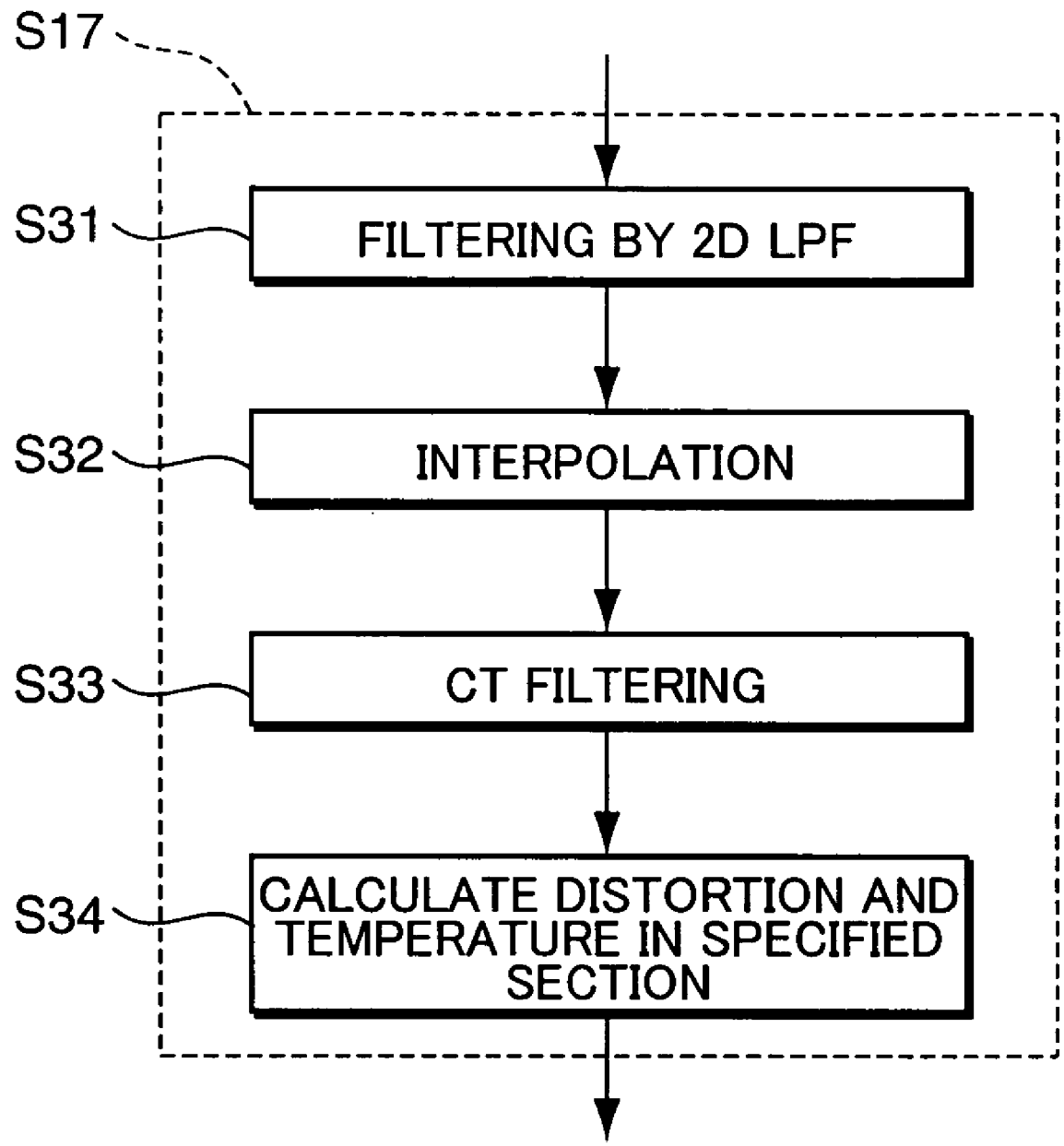
FIG. 9 is a flowchart showing operations in Step S17.
Figure 10A:
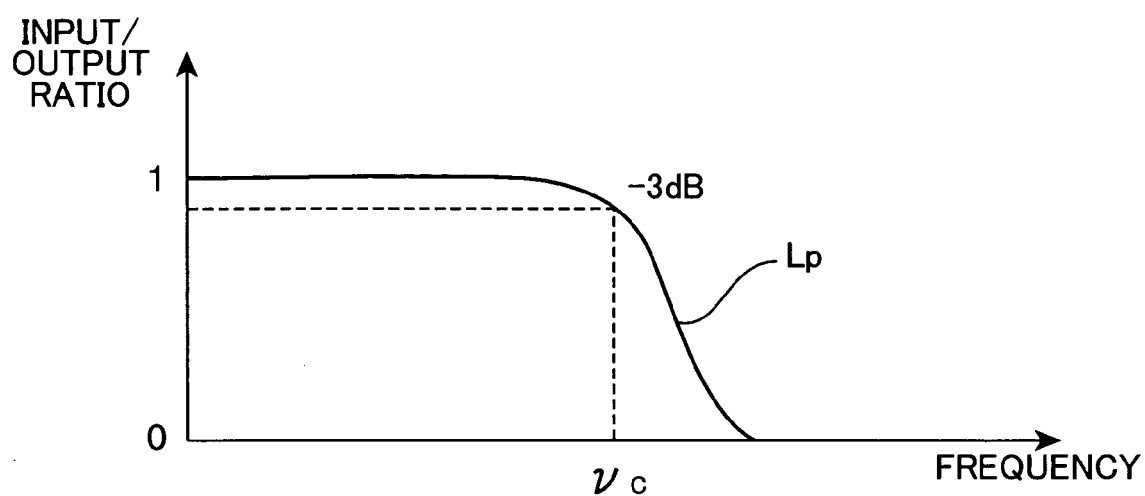
FIGS. 10A and 10B are graphs showing a frequency characteristic of a two-dimensional low-pass filter.
Figure 10B:
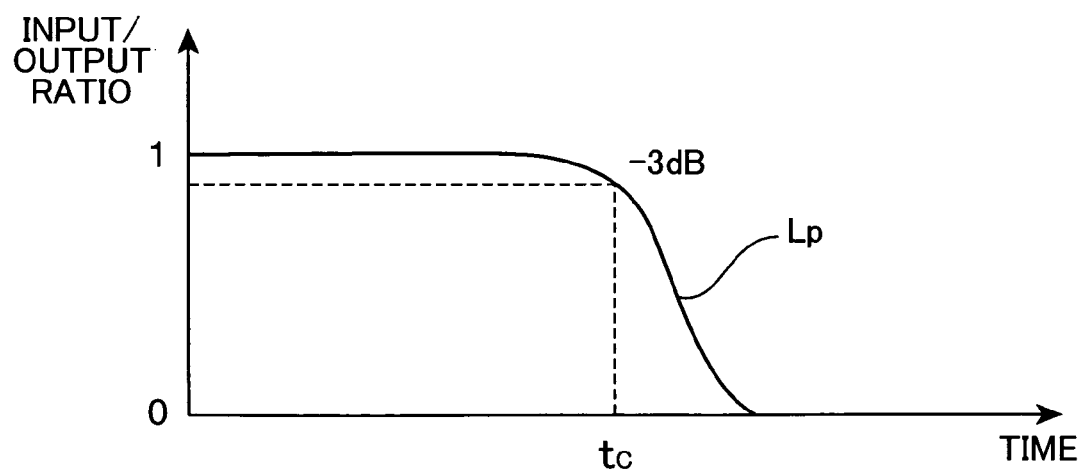
Figure 11:
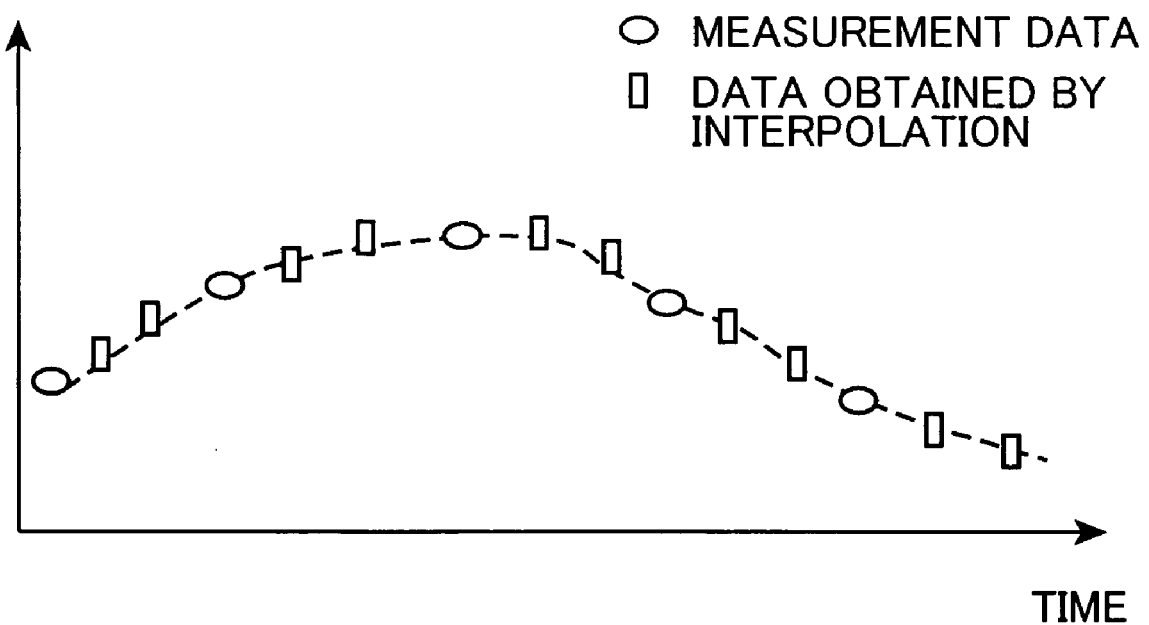
FIG. 11 is a graph showing a relationship between measurement points and interpolation points obtained from the measurement points.
Figure 12:
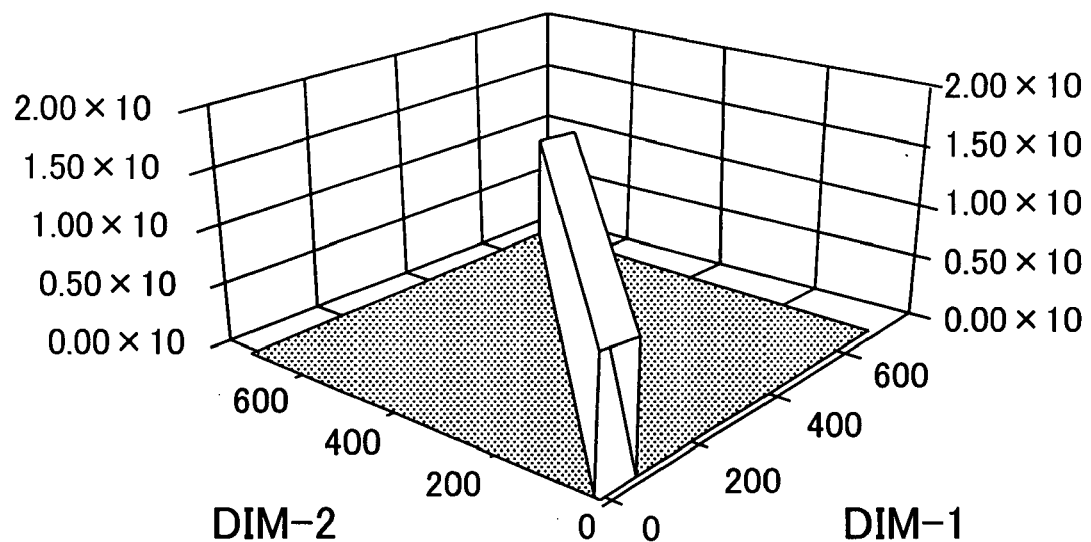
FIG. 12 is a graph showing a matrix a (i, j) defined by equation 3 in the case that a pulse light is rectangular.
Figure 13:
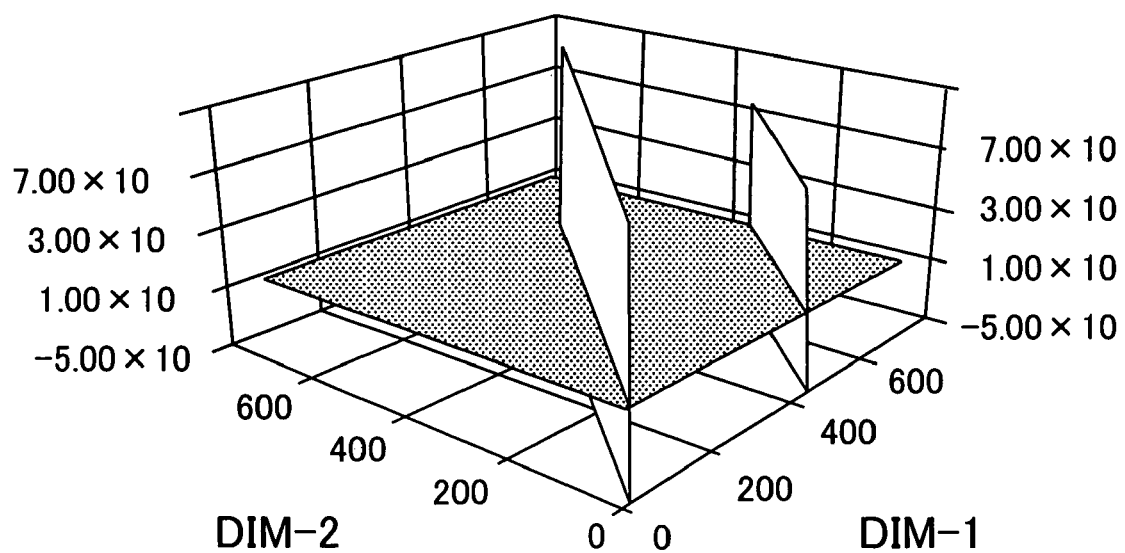
FIG. 13 is a graph showing a characteristic of a filter used in a CT processing.

FIG. 9 is a flowchart showing operations in Step S17. FIGS. 10A and 10B are graphs showing a frequency characteristic of a two-dimensional low-pass filter. FIG. 10A shows the frequency characteristic of the two-dimensional low-pass filter during a certain period, wherein a horizontal axis represents frequency and a vertical axis represents input/output ratio. FIG. 10B shows the frequency characteristic of the two-dimensional low-pass filter at a certain frequency, wherein a horizontal axis represents time and a vertical axis represents input/output ratio. FIG. 11 is a graph showing a relationship between measurement points and interpolation points obtained from the measurement points, FIG. 12 is a graph showing the matrix a(i, j) of equation (3) in the case that a pulse light is rectangular, and FIG. 13 is a graph showing a characteristic of a filter used in a CT processing.

In FIG. 9, the controlling/calculating unit 30 filters the measurement data saved in the buffer 29 using the two-dimensional low-pass filter having a frequency characteristic Lp shown in FIG. 10 (Step S31). Here, a cutoff frequency vc shown in FIG. 10 depends on the line width of the Brillouin scattering and is 100 MHz, for example, if this line width is 35 MHz. Subsequently, the controlling/calculating unit 30 interpolates a desired number data between two points where the measurement data are obtained, for example, by linear interpolation or nonlinear interpolation (Step S32). FIG. 11 shows a state where data □ at two points between measurement data ○ at two points are interpolated by linear interpolation. Subsequently, the controlling/calculating unit 30 applies CT filtering using a characteristic curve shown in FIG. 13 (Step S33). Then, the controlling/calculating unit 30 calculates the distortion and the temperature in each small space in accordance with the aforementioned equations (3) to (5), using the data after the operations in Step s31 to S33 (Step S34). In this way, the distortion and the temperature can be measured with a higher resolution. In the aforementioned interpolation, the distortion and the temperature can be measured at a higher resolution of an interval between the data □ which is three times shorter than an interval between the measurement data ○ determined by the A/D converter 28.

Next, another embodiment is described.

(Construction of Second Embodiment)

Although the distribution optical fiber sensor system 10 of the first embodiment obtains the data used to obtain the measured scattering gain spectrum A shown in FIG. 7 in Step S16 shown in FIG. 8 by repeating Steps S12 to S15 within a specified frequency range, a distribution optical fiber sensor system 11 of a second embodiment obtains data using a time-frequency analysis technique.

Figure 14:
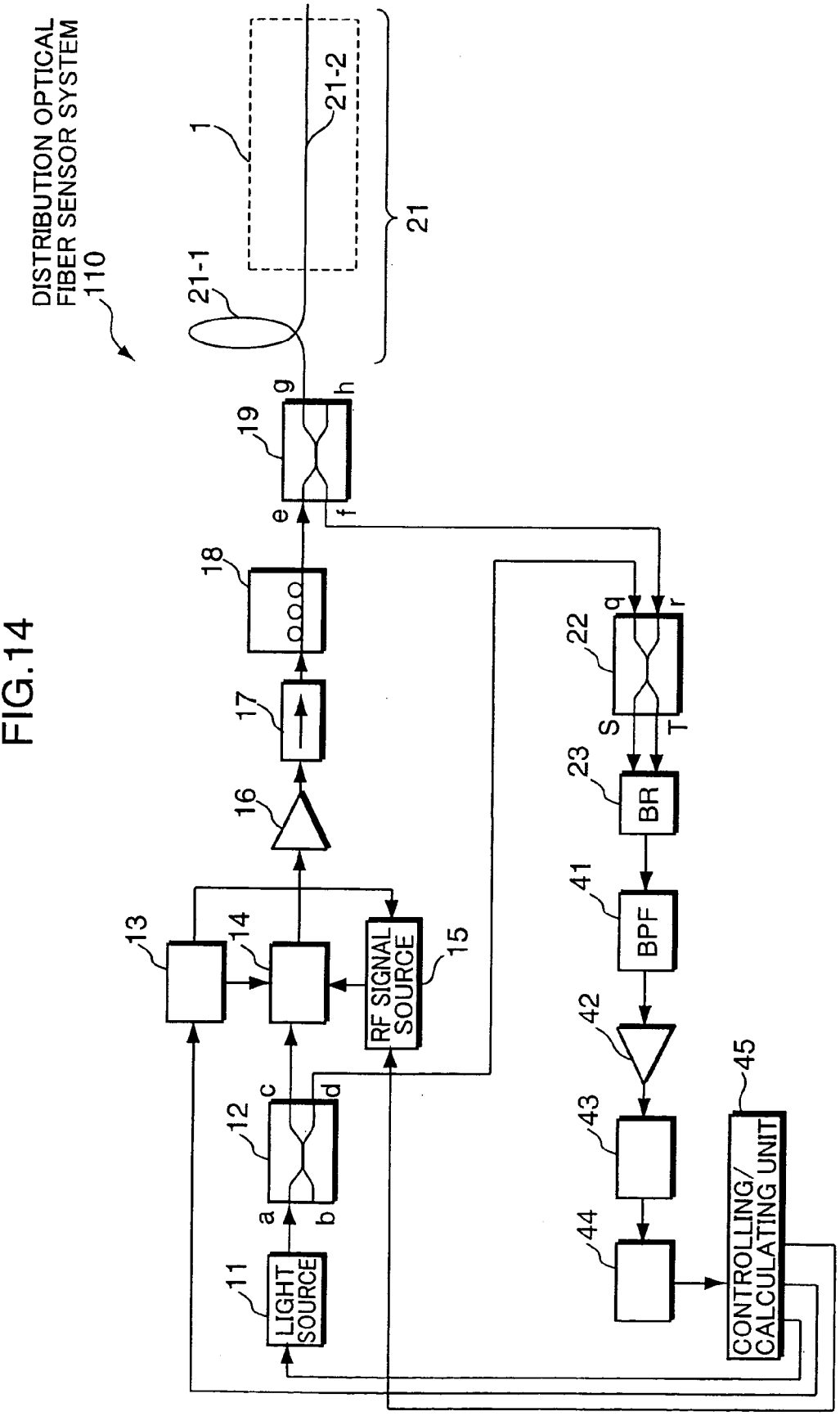
FIG. 14 is a diagram showing a construction of a distribution optical fiber sensor system according to a second embodiment.

FIG. 14 is a diagram showing a construction of a distribution optical fiber sensor system 110 according to the second embodiment. In FIG. 14, the distribution optical fiber sensor system 110 of the second embodiment is provided with a light source 11, optical couplers 12, 19, 22, a controller 13, a light frequency converter 14, an RF signal source 15, a light amplifier 16, an optical isolator 17, a polarization controller 18, an optical fiber 21, a light receiver 23, a BPF 41, an amplifier 42, an A/D converter 43, a time-frequency analyzer 44 and a controlling/calculating unit 45.

Next, operations of the distribution optical fiber sensor system 110 according to the second embodiment are described.

(Operations of Second Embodiment)

A CW laser beam having a frequency f0 and emitted from the light source 11 is incident on the light frequency converter 14 via the optical coupler 12. The incident CW laser beam is converted into a first pulse light having a frequency f1=5 GHz and a pulse width of 100 ns, and a second pulse light having a frequency f2=10.3 GHz and a pulse width of 30 ns in the light frequency converter 14, which are then incident on the light amplifier 16. There is a time interval of 2 ns between the first and second pulse lights. Thereafter, these first and second pulse lights are incident on the optical fiber 21 via the light amplifier 16, the optical isolator 17, the polarization controller 18 and the optical coupler 19 while acting in the same manner as in the first embodiment.

A Brillouin-scattered light created in the optical fiber 21 by the second pulse light is inputted to a port "r" of the optical coupler 22 via the optical coupler 19. The CW laser beam inputted to a port "q" and the Brillouin-scattered light inputted to the port "r" are coupled in the optical coupler 22 and distributed into two lights to be incident on the light receiver 23.

Here, in the case of using an optical fiber of 10.7 GHz, the following relationships hold: f1−f0=5 GHz, f2−f0=10.7 GHz (corresponding to Rayleigh-scattered light), f1−f0−fB=5.7 GHz, f2−f0−fB=0.4 GHz (400 MHz) by the interference (multiplexing) in the optical coupler 22. Thus, if a band width B is selected to be 2 GHz or shorter, only the Brillouin-scattered light by the second pulse light can be outputted from the light receiver 23. The band width B of the light receiver 23 may be so set as to hold equation (1) as in the first embodiment.

The distributed lights are inputted to the light receiver 23 to be photoelectrically converted. An output of the light receiver 23 is inputted to the BPF 41. For example, in this embodiment, the transmission characteristic of the BPF 41 is set such that a center frequency is 300 MHz and a transmission frequency range is 400 MHz. Thus, an output of the BPF 41 takes a maximum frequency of 500 MHz and a minimum frequency of 100 MHz.

The output of the BPF 41 is amplified to a specified level in the amplifier 42 and converted from an analog signal into a digital signal in the A/D converter 43. Here, in the aforementioned case, a sampling rate of the A/D converter 43 is set at 4×500=2000 MS or larger. In this embodiment, this sampling rate is set at 8 GS. An output of the A/D converter 43 is inputted to the time-frequency analyzer 44.

Figure 15:
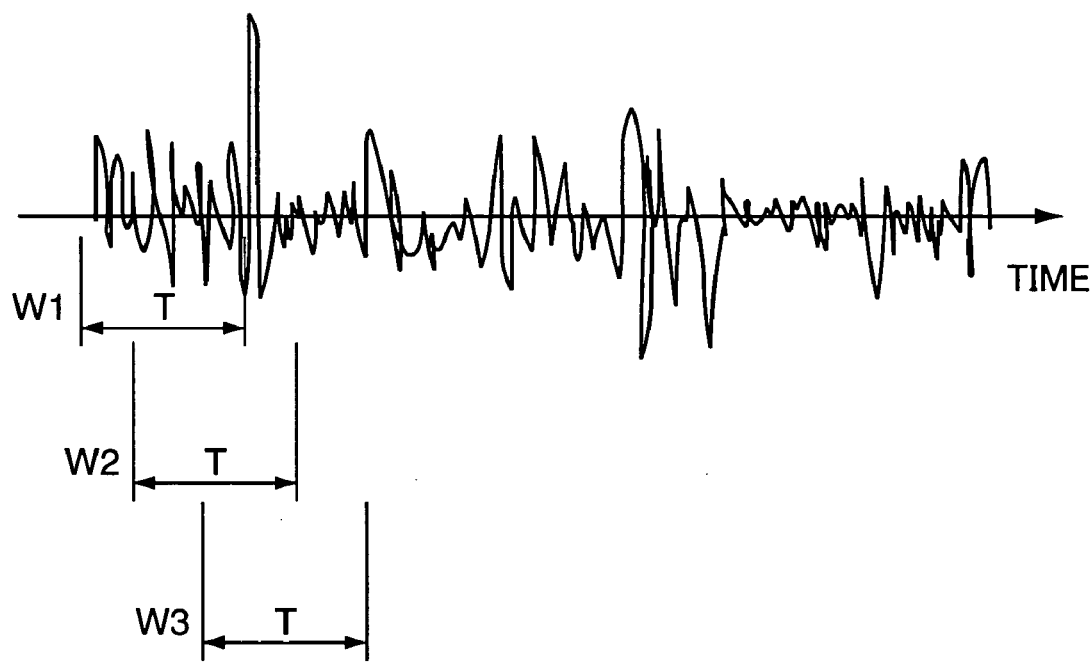
FIG. 15 is a chart showing an exemplary waveform of an input to a time-frequency analyzer 44.
Figure 16:
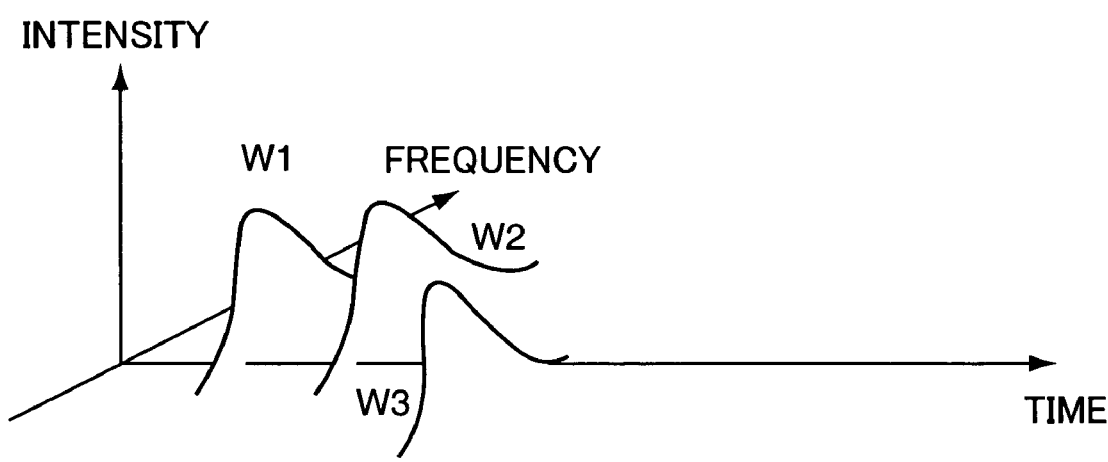
FIG. 16 is a graph showing frequency spectra at time windows.

FIG. 15 is a chart showing an exemplary waveform of an input to the time-frequency analyzer 44, wherein a horizontal axis represents time and a vertical axis represents amplitude. FIG. 16 is a graph showing frequency spectra at time windows, wherein x-axis, y-axis and z-axis of FIG. 16 represent time, frequency and intensity, respectively.

The time-frequency analyzer 44 sets a time window W1 of a specified period T and applies Fourier transform to data in this time window W1 to obtain a frequency spectrum Spw1. By successively shifting the time window W1 by a specified time dw to a time window W2, a time window W3, etc., frequency spectra Spw2, Spw3, . . . at the respective times are obtained in real time as shown in FIG. 16. Here, Spw2 is a frequency spectrum at time (T+dw)/2 from Spw1.

For example, in this embodiment, the specified period T is set at 400 ns, 3200 data are obtained during this period T, and Fourier transform is applied to the obtained data to obtain the frequency spectra. Further, the specified time dw is set at 10 ns, and the frequency spectra at the respective times are obtained.

For example, a real-time spectrum analyzer or the like may be used as such a time-frequency analyzer 44. Although the time-frequency analysis technique is used to obtain the frequency spectra at the respective times in this embodiment, wavelet transform may be used.

The controlling/calculating unit 45 measures a distortion created in the optical fiber 21 and the temperature of the optical fiber 21 with a spatial resolution of 10 cm in accordance with equations (3) to (5) in the same manner as in the first embodiment, using the frequency spectra at the respective times obtained in the time-frequency analyzer 44.

Next, operations in the case of actually measuring the distortion and the temperature using the distribution optical fiber sensor system 110 are described.

Figure 17:
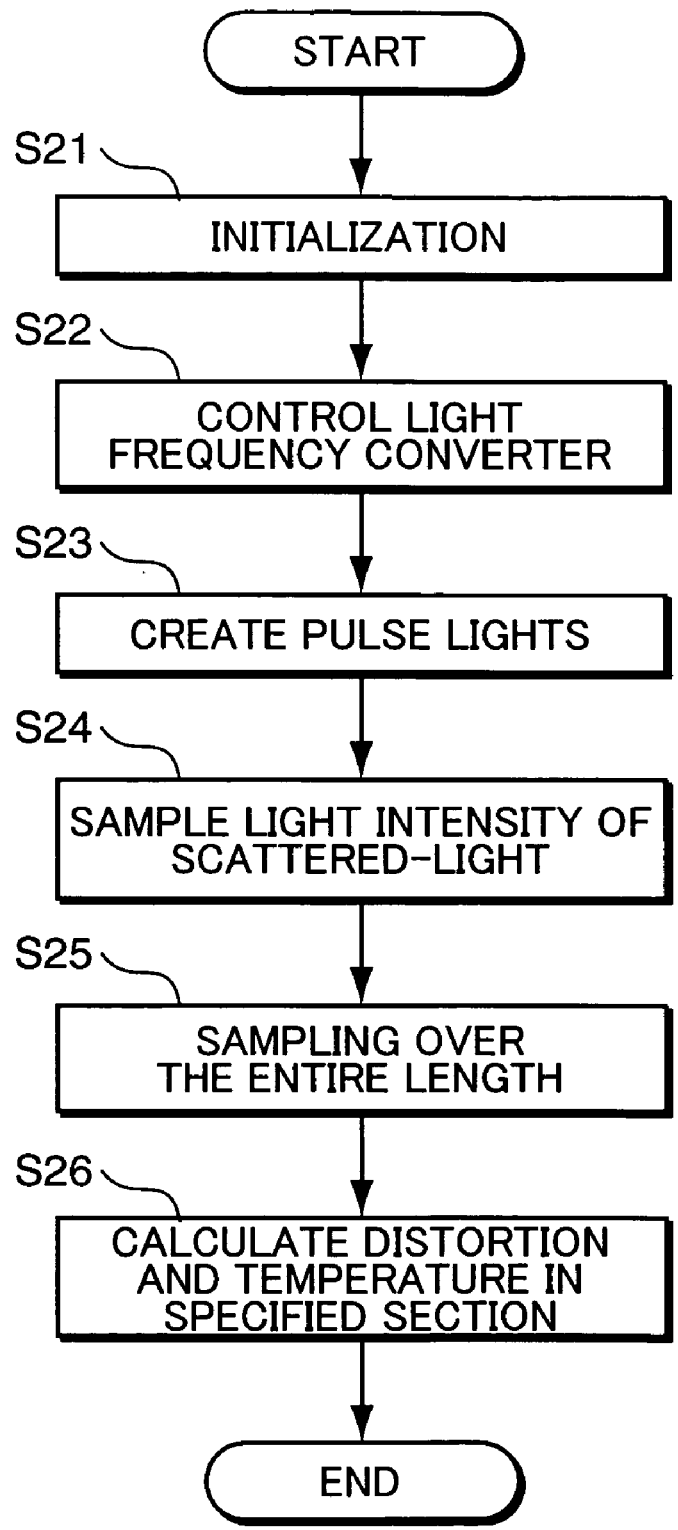
FIG. 17 is a flowchart showing operations of the distribution optical fiber sensor system according to the second embodiment.

FIG. 17 is a flowchart showing the operations of the distribution optical fiber sensor system 110 according to the second embodiment.

In FIG. 17, the controlling/calculating unit 45 first performs initial settings by initializing the respective devices and causing the RF signal source 15 to operate (Step S21). Subsequently, the controlling/calculating unit 45 controls the controller 13 so that the aforementioned first and second pulse lights can be outputted from the light frequency converter 14 (Step S22). The controlling/calculating unit 45 then drives the light source 11 to cause it to emit a CW laser beam and causes the light frequency converter 14 to output the first and second pulse lights (Step S23). The outputted first and second pulse lights act as described above in the respective devices, and the Brillouin-scattered light by the second pulse light is sampled (Step S24). Subsequently, the Brillouin-scattered light is sampled over a specified period to perform sampling over the entire length of a detection light fiber portion 21-2 (Step S25).

In this way, frequency spectra as shown in FIG. 16, i.e., data used to obtain a scattering gain spectrum, are obtained in the respective small spaces. Subsequently, the controlling/calculating unit 45 calculates the distortion and the temperature for each small space with a high spatial resolution in accordance with the aforementioned equations (3) to (5), using the data obtained in the time-frequency analyzer 44 (Step S26).

In addition to the effects of the distribution optical fiber sensor system 10 of the first embodiment, the distribution optical fiber sensor system 110 of this embodiment has further effects of a shorter measuring time and a real-time measurement since the time-frequency analysis technique is used to obtain the data as described above, making frequency scanning unnecessary unlike the first embodiment. Therefore, even objects to be measured whose distortion and temperature dynamically change can be measured.

Next, still another embodiment is described.

(Third Embodiment)

In a distribution optical fiber sensor system 120 according to a third embodiment, a pump light comprised of a first and a second pulse lights and a probe light are so incident on an optical fiber that the probe light faces in a propagating direction of the first and second pulse lights, the probe light is amplified by Brillouin scattering caused by the second pulse light, and the distortion and the temperature are calculated by detecting the Brillouin-amplified probe light (Brillouin-scattered light).

Figure 18:
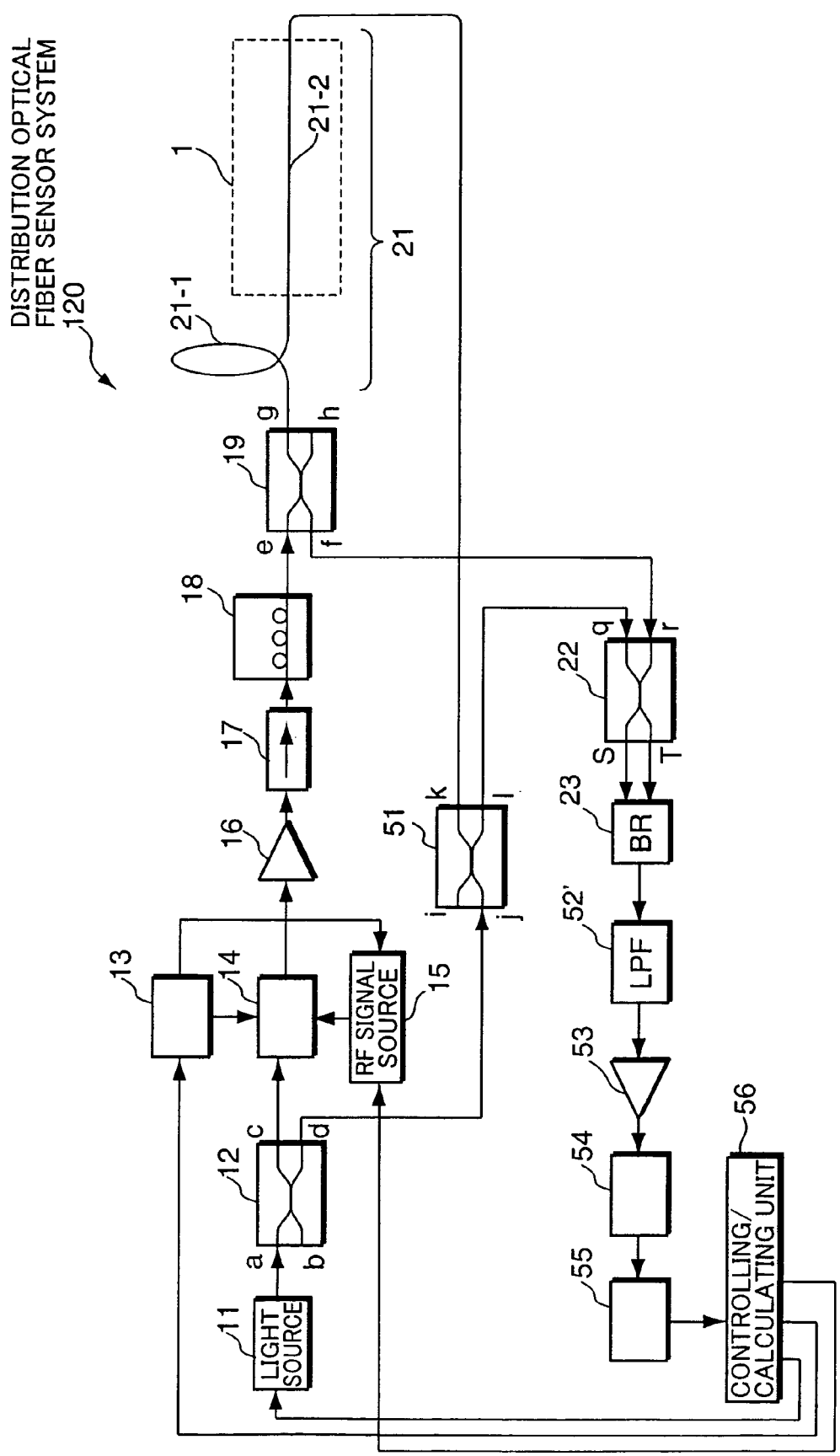
FIG. 18 is a diagram showing a construction of a distribution optical fiber sensor system according to a third embodiment.

FIG. 18 is a diagram showing a construction of a distribution optical fiber sensor system 120 according to the third embodiment.

In FIG. 18, the distribution optical fiber sensor system 120 of the third embodiment is provided with a light source 11, optical couplers 12, 19, 22, 51, a controller 13, a light frequency converter 14, an RF signal source 15, a light amplifier 16, an optical isolator 17, a polarization controller 18, an optical fiber 21, a light receiver 23, a LPF 52', an amplifier 53, an A/D converter 54, a buffer 55 and a controlling/calculating unit 56.

Next, operations of the distribution optical fiber sensor system 120 according to the third embodiment are described.

(Operations of Third Embodiment)

A CW laser beam having a frequency f0 and emitted from the light source 11 is incident on the light frequency converter 14 via the optical coupler 12. The incident CW laser beam is converted into a first pulse light having a frequency f1=12 GHz and a pulse width of 100 ns, and a second pulse light having a frequency f2=10.8 GHz and a pulse width of 30 ns in the light frequency converter 14, which are then incident on the light amplifier 16. There is a time interval of 2 ns between the first and second pulse lights. Thereafter, these first and second pulse lights are incident on one end of the optical fiber 21 via the light amplifier 16, the optical isolator 17, the polarization controller 18 and the optical coupler 19 while acting in the same manner as in the first embodiment.

On the other hand, the CW laser light distributed in the optical coupler 12 and outputted from a port "d" of the optical coupler 12 is incident on a port "j" of the optical coupler 51 and distributed into two lights. One of the distributed light is outputted from a port "l" and incident on a port "q" of the optical coupler 22, whereas the other thereof is outputted from a port "k" and incident on the other end of the optical fiber 21. The CW laser beam incident on the other end of the optical fiber 21 becomes the probe light.

The probe light (Brillouin-scattered light) amplified by Brillouin scattering of the second pulse light in the optical fiber 21 is incident on a port "r" of the optical coupler 22 via the optical coupler 19. The CW laser beam incident on the port "q" and the Brillouin-scattered light incident on the port "r" are coupled in the optical coupler 22 and distributed into two lights to be incident on the light receiver 23. Specifically, these distributed lights serve for a homodyne detection.

Here, in the case of using an optical fiber of 10.5 GHz, the following relationships hold: f1−f0=12 GHz, f2−f0=10.8 GHz, f1−f0−fB=1.5 GHz, f2−f0−fB=0.3 GHz (300 MHz) by the interference (multiplexing) in the optical coupler 22. Thus, if a band width B is selected to be 1 GHz, only the Brillouin-scattered light by the second pulse light can be outputted from the light receiver 23. The band width B of the light receiver 23 may be so set as to hold equation (1) as in the first embodiment.

The distributed lights are inputted to the light receiver 23 to be photoelectrically converted. An output of the light receiver 23 is inputted to the LPF 52'. For example, in this embodiment, the transmission characteristic of the LPF 52' is set such that a transmission frequency range is 100 MHz.

An output of the BPF 52' is amplified to a specified level in the amplifier 52 and converted from an analog signal into a digital signal in the A/D converter 54. Here, in the aforementioned case, a sampling rate of the A/D converter 54 is set at 1600 MS or larger and converted into the intensity of the RF signal. In this embodiment, this sampling rate is set at 2 GS. The buffer 55 temporarily saves an output of the A/D converter 54. The controlling/calculating unit 30 controls the respective devices of the distribution optical fiber sensor system 120 and measures a distortion created in the optical fiber 21 and the temperature of the optical fiber 21 with a spatial resolution of 5 cm in accordance with equations (3) to (5) in the same manner as in the first embodiment using the data saved in the buffer 55.

Since operations in the case of actually measuring the distortion and the temperature using the distribution optical fiber sensor system 120 are the same as those of the distribution optical fiber sensor system 10 of the first embodiment shown in FIG. 8, no description is given thereon.

In addition to the effects of the distribution optical fiber sensor system 10 of the first embodiment, the distribution optical fiber sensor system 120 of this embodiment has further effects of a stronger signal light and a longer measuring distance since the probe light is used as described above.

Next, further another embodiment is described.

(Fourth Embodiment)

Although the distribution optical fiber sensor system 120 of the third embodiment detects the Brillouin-scattered light by the homodyne detection, a distribution optical fiber sensor system 130 of a fourth embodiment detects the Brillouin-scattered light by a heterodyne detection.

FIG. 19 is a diagram showing a construction of the distribution optical fiber sensor system 130 according to the fourth embodiment. In FIG. 19, the distribution optical fiber sensor system 130 of the fourth embodiment is provided with a light source 11, optical couplers 12, 19, 22, 51, a controller 13, light frequency converters 14, 57, an RF signal source 15, a light amplifier 16, an optical isolator 17, a polarization controller 18, an optical fiber 21, a light receiver 23, a BPF 52, an amplifier 53, an A/D converter 54, a buffer 55 and a controlling/calculating unit 56.

Next, operations of the distribution optical fiber sensor system 130 according to the fourth embodiment are described.

(Operations of Fourth Embodiment)

A CW laser beam having a frequency f0 and emitted from the light source 11 is incident on the light frequency converter 14 via the optical coupler 12. The incident CW laser beam is converted into a first pulse light having a frequency f1=12 GHz and a pulse width of 100 ns, and a second pulse light having a frequency f2=10.8 GHz and a pulse width of 30 ns in the light frequency converter 14, which are then incident on the light amplifier 16. There is a time interval of 2 ns between the first and second pulse lights. Thereafter, these first and second pulse lights are incident on one end of the optical fiber 21 via the light amplifier 16, the optical isolator 17, the polarization controller 18 and the optical coupler 19 while acting in the same manner as in the first embodiment.

On the other hand, the CW laser light distributed in the optical coupler 12 and outputted from a port "d" of the optical coupler 12 is incident on a port "j" of the optical coupler 51 and distributed into two lights. One of the distributed light is outputted from a port "l", has the frequency thereof converted into a specified frequency (fao) in the light frequency converter 57, and is incident on a port "q" of the optical coupler 22, whereas the other thereof is outputted from a port "k" and incident on the other end of the optical fiber 21. The CW laser beam incident on the other end of the optical fiber 21 becomes a probe light.

The probe light (Brillouin-scattered light) amplified by Brillouin scattering of the second pulse light in the optical fiber 21 is incident on a port "r" of the optical coupler 22 via the optical coupler 19. The CW laser beam of a specified frequency incident on the port "q" and the Brillouin-scattered light incident on the port "r" are coupled in the optical coupler 22 and distributed into two lights to be incident on the light receiver 23. Since the specified frequency (fao) is set at 120 MHz, this light serves for a heterodyne detection.

The distributed lights are inputted to the light receiver 23 to be photoelectrically converted. An output of the light receiver 23 is inputted to the BPF 52. For example, in this embodiment, the transmission characteristic of the BPF 52 is set such that a center frequency is 120 MHz and a transmission frequency range is set at 1 MHz.

An output of the BPF 52 is amplified to a specified level in the amplifier 52 and converted from an analog signal into a digital signal in the A/D converter 54. Here, in the aforementioned case, a sampling rate of the A/D converter 54 is set at 500 MS or larger. In this embodiment, this sampling rate is set at 1 GS. An output of the A/D converter 54 is temporarily saved in the buffer 55. The controlling/calculating unit 30 controls the respective devices of the distribution optical fiber sensor system 130 and measures a distortion created in the optical fiber 21 and the temperature of the optical fiber 21 with a spatial resolution of 10 cm in accordance with equations (3) to (5) in the same manner as in the first embodiment using the data saved in the buffer 55.

Since operations in the case of actually measuring the distortion and the temperature using the distribution optical fiber sensor system 130 are the same as those of the distribution optical fiber sensor system 10 of the first embodiment shown in FIG. 8, no description is given thereon.

In addition to the effects of the distribution optical fiber sensor system 10 of the first embodiment, the distribution optical fiber sensor system 130 of this embodiment has further effects of an elongated measurement range and a higher precision since the probe light is used as described above.

Next, further another embodiment is described.

Fifth Embodiment)

A distribution optical fiber sensor system 140 according to a fifth embodiment is so constructed as to amplify a Brillouin-scattered light by a second pulse light by looping it and to measure a distortion and a temperature by detecting the amplified Brillouin-scattered light.

Figure 20A:
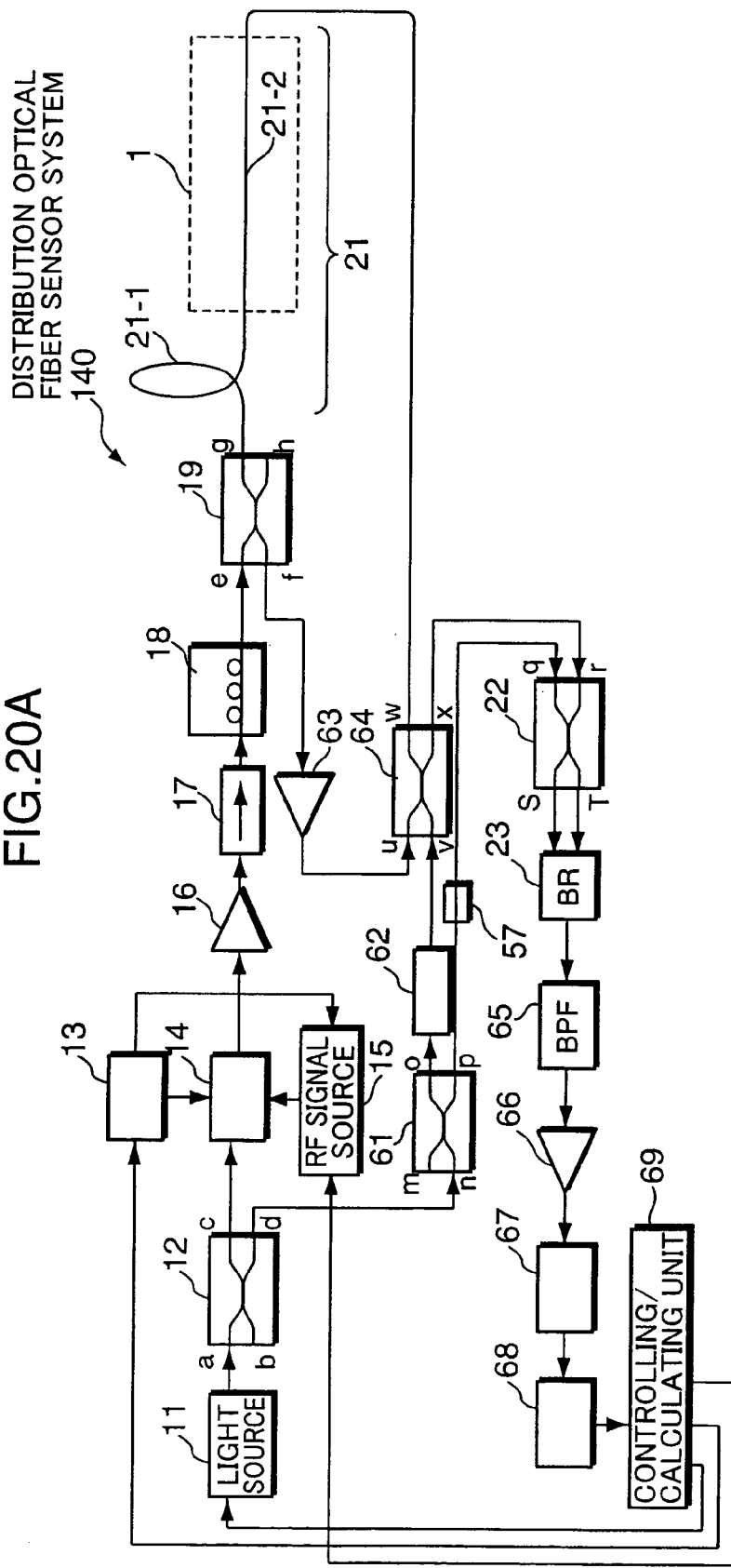
FIG. 20 is a diagram showing a construction of a distribution optical fiber sensor system according to a fifth embodiment.
Figure 20B:
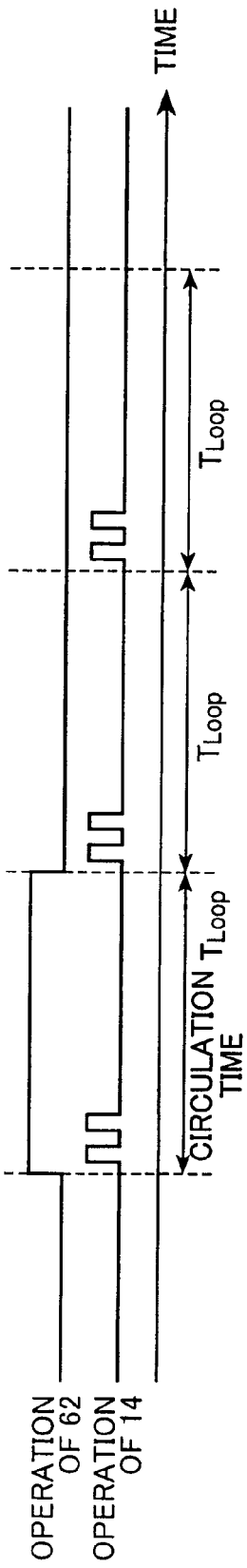
Figure 21:
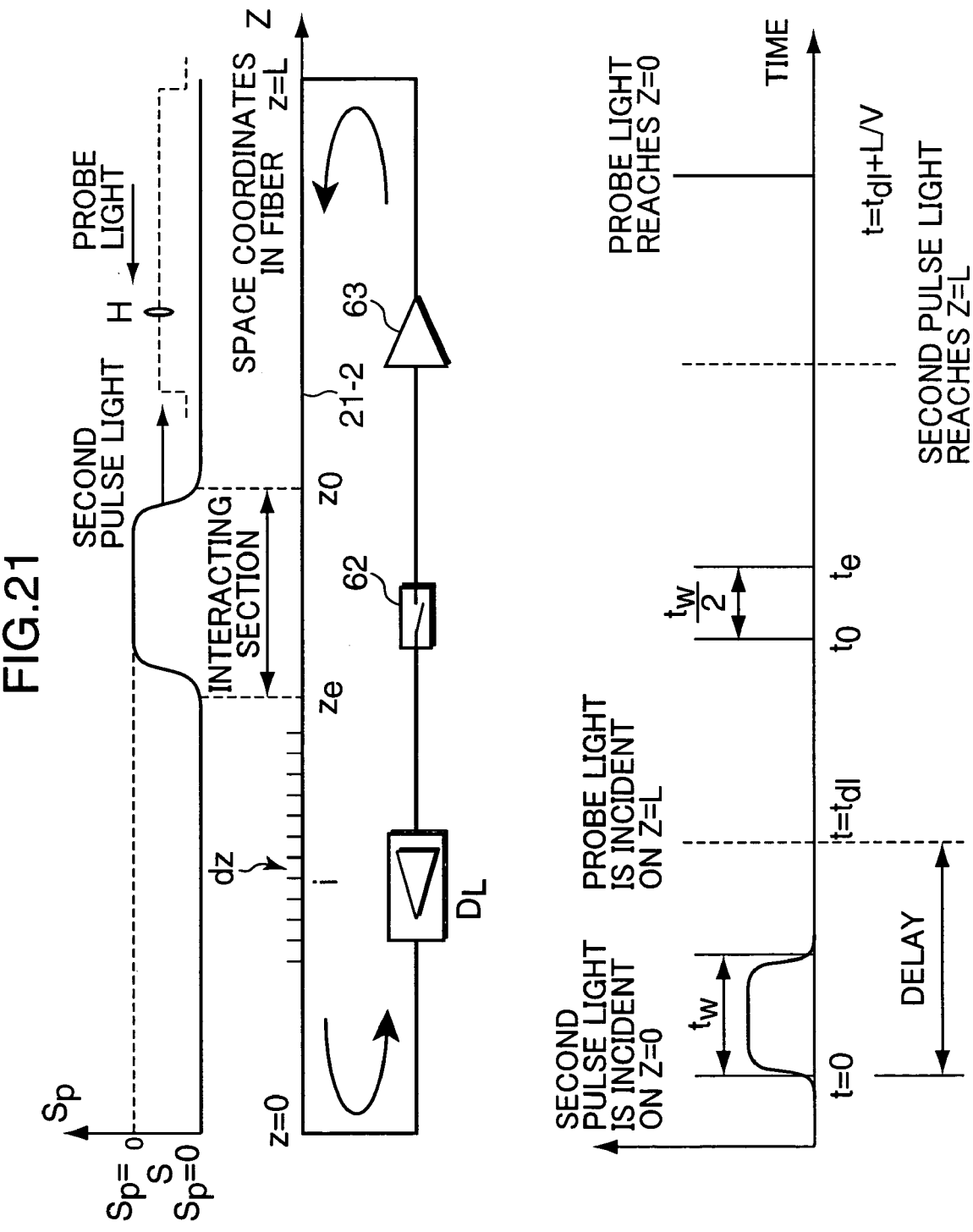
FIG. 21 is a diagram showing a physical process of the fifth embodiment.

FIGS. 20A and 20B are diagrams showing the distribution optical fiber sensor system 140 of the fifth embodiment, wherein FIG. 20A shows a construction thereof and FIG. 20B is a timing chart showing operations of a optical gate switch and a light frequency converter. FIG. 21 is a diagram showing a physical process of the fifth embodiment.

In FIG. 20A, the distribution optical fiber sensor system 140 of the fifth embodiment is provided with a light source 11, optical couplers 12, 19, 22, 61, 64, a controller 13, light frequency converters 14, 57, an RF signal source 15, light amplifiers 16, 63, an optical isolator 17, a polarization controller 18, an optical fiber 21, a light receiver 23, an optical gate switch 62, a BPF 65, an amplifier 66, an A/D converter 67, a buffer 68 and a controlling/calculating unit 69. The optical gate switch 62 is an optical switch for transmitting (ON) or shutting off (OFF) an incident light in accordance with a control signal.

Next, operations of the distribution optical fiber sensor system 140 according to the fifth embodiment are described.

(Operations of Fifth Embodiment)

A CW laser beam having a frequency f0 and emitted from the light source 11 is incident on the light frequency converter 14 via the optical coupler 12. The incident CW laser beam is converted into a first pulse light having a frequency f1=12 GHz and a pulse width of 100 ns, and a second pulse light having a frequency f2=10.8 GHz and a pulse width of 30 ns in the light frequency converter 14, which are then incident on the light amplifier 16 at timings shown in FIG. 20B. There is a time interval of 2 ns between the first and second pulse lights. Thereafter, these first and second pulse lights are incident on one end of the optical fiber 21 via the light amplifier 16, the optical isolator 17, the polarization controller 18 and the optical coupler 19 while acting in the same manner as in the first embodiment.

On the other hand, the CW laser light distributed in the optical coupler 12 and outputted from a port "d" of the optical coupler 12 is incident on a port "n" of the optical coupler 61 and distributed into two lights. One of the distributed lights is outputted from a port "o" and is incident on a port "v" of the optical coupler 64 via the optical gate switch 62 at a timing shown in FIG. 20B, whereas the other thereof is outputted from a port "p", has the frequency thereof converted into a specified frequency in the light frequency converter 57 and is incident on a port "q" of the optical coupler 22.

Further, the CW laser beam incident on the port "v" of the optical coupler 64 is outputted from a port "w" and incident on the other end of the optical fiber 21. The CW laser beam incident on the other end of the optical fiber 21 becomes a probe light. On the other hand, the probe light (Brillouin-scattered light) amplified by Brillouin scattering of the second pulse light in the optical fiber 21 is outputted from a port "f" of the optical coupler 19, amplified to a specified level in the light amplifier 63, and incident on a port "u" of the optical coupler 64. The Brillouin-scattered light incident on the port "u" is distributed in the optical coupler 64, and the Brillouin-scattered light outputted from the port "w" is incident on the other end of the optical fiber 21. The CW laser beam (probe light) outputted from the optical gate switch 62 in this way circulates a loop of the optical coupler 64→the optical fiber 21→the optical coupler 19→the light amplifier 63→the optical coupler 64 by a specified number of times. The first and second pulse lights are outputted from the light frequency converter 14 during this circulation at every interval of a circulation time TLoop shown in FIG. 20B under the control of the controlling/calculating unit 69 so as to interact with the circulating probe light at the same timing. Because of the repeated interaction in the optical fiber 21 by circulating the loop by the specified number of times, the distortion and the temperature of the optical fiber 21 can be better reflected and the polarized states of the second pulse light and the probe light can be averaged. Therefore, the dynamically changing distortion and temperature can also be dealt with.

On the other hand, the other Brillouin-scattered light distributed in the optical coupler 64 is incident on a port "r" of the optical coupler 22. The CW laser beam incident on the port "q" and the Brillouin-scattered light incident on the port "r" are coupled in the optical coupler 22 and distributed into two lights. These distributed lights are respectively inputted to the light receiver 23 to be photoelectrically converted. Here, an output of the light receiver 23 is outputted to the BPF 65 at a timing after the Brillouin-scattered light circulates the specified time of times, e.g., 40 times under the control of the controlling/calculating unit 69.

Here, in the case of using an optical fiber of 10.5 GHz, the following relationships hold: f1−f0=12 GHz, f2−f0=10.8 GHz, f1−f0−fB=1.5 GHz, f2−f0−fB=0.3 GHz (300 MHz) by the interference (multiplexing) in the optical coupler 22. Thus, if a center frequency and a transmission frequency range are selected to be 120 MHz and 1 MHz, respectively, only the Brillouin-scattered light by the second pulse light can be outputted from the light receiver 23.

An output of the BPF 65 is amplified to a specified level in the amplifier 66 and converted from an analog signal into a digital signal in the A/D converter 67. Here, in the aforementioned case, a sampling rate of the A/D converter 67 is set at 400 MS or larger. According to the procedure described with reference to FIG. 9, interpolation is substantially applied at 2000 MS. In this embodiment, this sampling rate is set at 2 GS. The buffer 55 temporarily saves an output of the A/D converter 54. The controlling/calculating unit 30 control the respective devices of the distribution optical fiber sensor system 10 and measures a distortion created in the optical fiber 21 and the temperature of the optical fiber 21 with a spatial resolution of 5 cm in accordance with equations (3) to (5) as in the first embodiment using the data saved in the buffer 55.

Here, Qs(i) in equation (3) is obtained as follows. In FIG. 21, Z-axis having an origin at the starting point of a reference light fiber portion 21-1 is set along the longitudinal direction of the optical fiber 21. Further, $D_L$ in FIG. 21 collectively represents a loss in the loop of the optical coupler 64→the optical fiber 21→the optical coupler 19→the light amplifier 63→the optical coupler 64. The probe light incident on Z=L and circulating in the k-th time is expressed as in equation (6).

$$\ln P_P(0)^{(k)} = -\int_{z0}^{ze} R^{(k)}(Z)\gamma(Z,S)S_S(Z)\,dZ - \alpha_P L + \ln P_P(L)^{(k-1)} \quad (6)$$

where $Ps^{(k)}(z)$ represents the intensity of the probe light having a frequency s at position z in the k-th time. $R^{(k)}(z)$ represents a polarization coefficient of the second pulse light and the probe light at the position z in the k-th time and is a random number from 0 to 1 in a single-mode optical fiber. $\gamma(z,s)$ represents a Brillouin amplification coefficient corresponding to the frequency s at the position z and basically depends on the distortion and the temperature once the wavelength is determined. $\alpha s$ represents an attenuation coefficient of the optical fiber 21, and Sp(z) is an energy density of the second pulse light and expressed as in equation (7).

$$Sp(z) = \frac{Ps(z)}{Aeff} \quad (7)$$

where Aeff is an effective cross sectional area of the optical fiber 21. Further, equation (8) holds from FIG. 21.

$$Ps^{(k-1)}(L) = D_L G_E^{(k-1)}(P_S^{(k-2)}(0)) \quad (8)$$

If equations (6) to (8) are put together and the detection light fiber portion 21-2 is equally divided into a plurality of small sections having a length dz and put into a differential equation, following equations (9) to (12) hold.

$$\sum_{j=je}^{jo} a_{ij} R_i^k r_{j,s} = Q_{i,s}^k \quad (9)$$

$$a_{i,j} = \frac{P_s^j dz}{Aeff} \exp(-\alpha_P Z_j) \quad (10)$$

$$R_i^k = \frac{\sum_{nk=1}^{k} R_j^{(nk)}}{k-1} \quad (11)$$

$$Q_{i,s}^k = \frac{1}{k-1}\ln\left(\frac{P_s^0}{P_s^{(k)}(L)}\right) - \alpha s L \frac{k-2}{k-1}\ln(\beta) \quad (12)$$

where suffixes i, j are the numbers of the small sections. As can be seen from equation (11), $R_j^k$ is an average value of random numbers. Thus, the values of the respective small sections can approximate to the same constant if the number of circulation k is made larger.

In addition to the effects of the distribution optical fiber sensor system 10 of the first embodiment, the distribution optical fiber sensor system 140 of this embodiment has further effects that the distortion and temperature of the optical fiber 21 can be better reflected and the polarized states of the second pulse light and the probe light can be averaged since the Brillouin-scattered light is looped as described above. Therefore, the dynamically changing distortion and temperature can also be dealt with.

On the other hand, in the first to fifth embodiments, a lateral pressure acts on the optical fiber 21 at the same time it acts on the structure 1, thereby causing a distortion in the optical fiber in radial direction. This radial distortion can be obtained by calculating the lateral pressure in each small section by comparing an average scattering gain spectrum in relation to various polarized lights (average scattering gain spectrum) and a scattering gain spectrum in relation to a certain specific polarized light (specific scattering gain spectrum).

Figure 22:
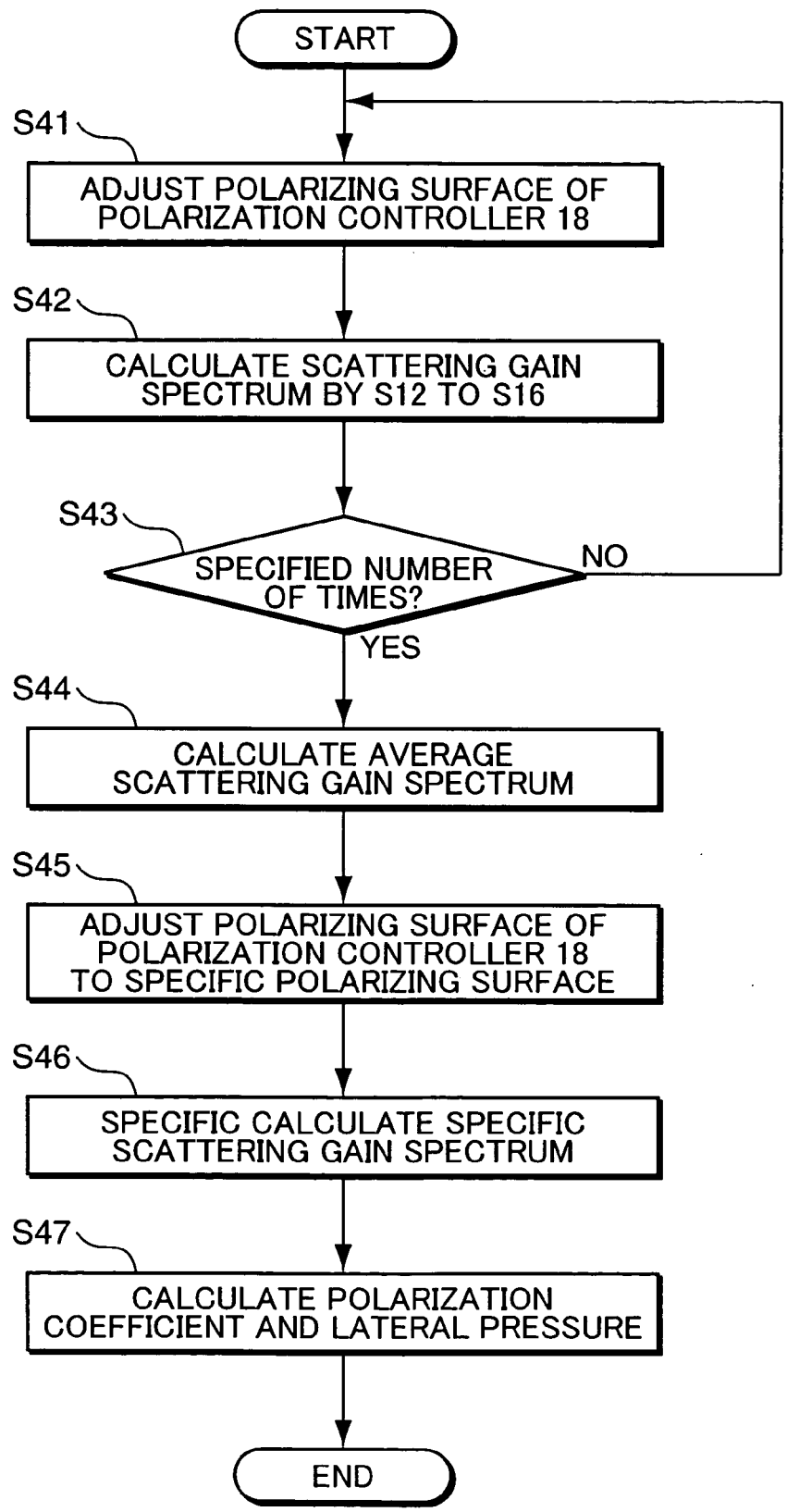
FIG. 22 is a diagram showing a flowchart in the case of calculating a lateral pressure.
Figure 23:
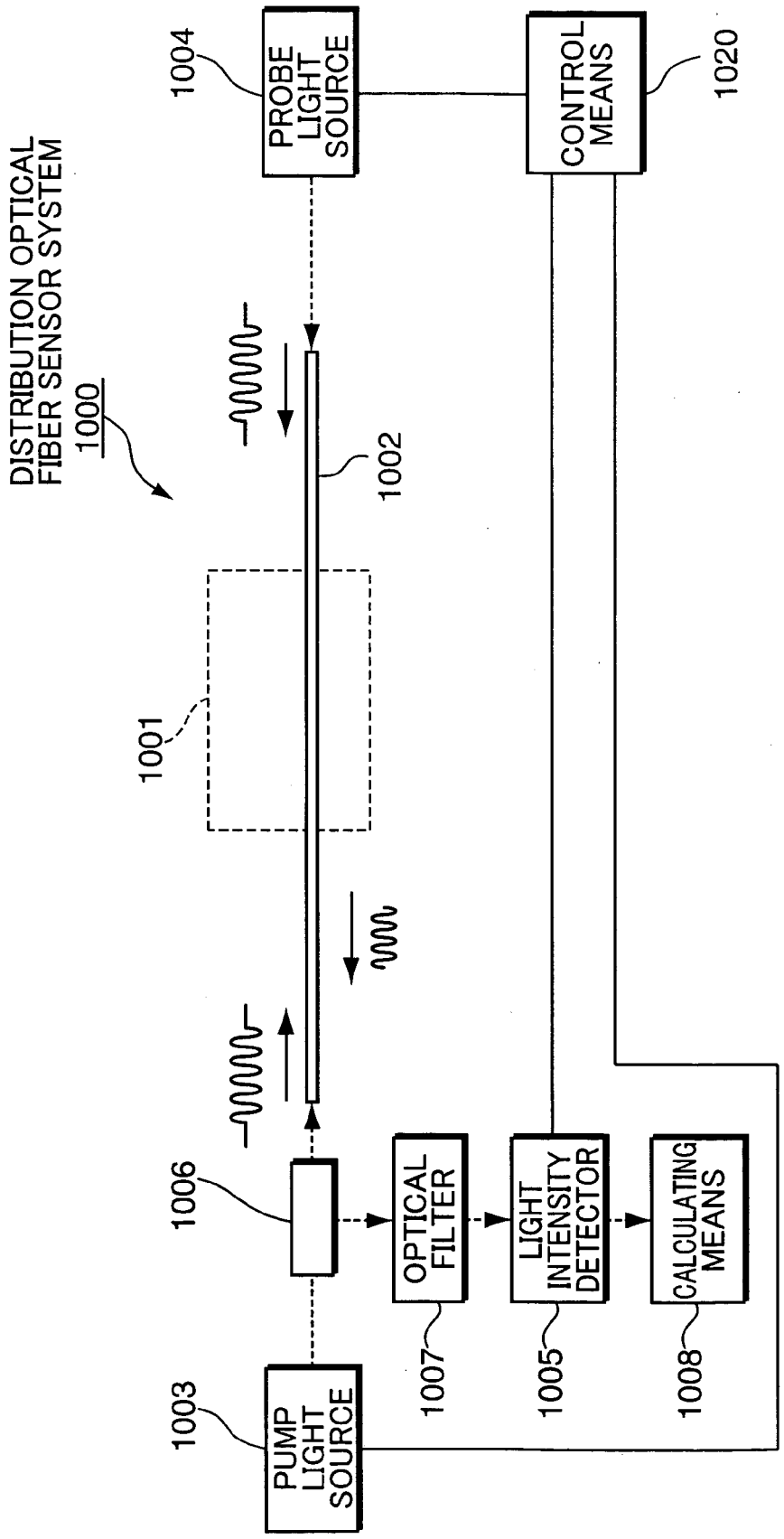
FIG. 23 is a diagram showing a construction of a distribution optical fiber sensor system disclosed in Japanese Unexamined Patent Publication No. 2000-074697.

FIG. 22 is a flowchart in the case of calculating the lateral pressure. In FIG. 22, a polarizing surface of the polarization controller 18 is first adjusted to a suitable polarizing surface (Step S41), and a scattering gain spectrum is obtained in Steps S12 to S16 described with reference to FIG. 8 (Step S42). Steps S41 and S42 are repeated by a specified number of times suitable to obtain an average while changing the polarizing surface (Step S43). After these Steps are repeated by a specified number of times, an average scattering gain spectrum is obtained by averaging the scattering gain spectra corresponding to the respective polarizing surfaces (Step S44).

Subsequently, the polarizing surface of the polarization controller 18 is maintained at a specific polarizing surface (Step S45), and a scattering gain spectrum corresponding to this specific polarizing surface (specific scattering gain spectrum) is calculated by Steps S12 to S16 (Step S46). A polarization coefficient is obtained from the average scattering gain spectrum and the specific scattering gain spectrum to calculate the lateral pressure (Step S47).

In this way, the radial distortion of the optical fiber 21 can also be measured by using the distribution optical fiber sensor systems of the first to fifth embodiments.

As described above, a distribution optical fiber sensor system comprises: an optical fiber for sensing to be placed on an object to be measured, a light source for emitting a first pulse light having a pulse width longer than a transient response of an acoustic phonon and emitting a second pulse light in succession to the first pulse after a time interval during which the vibration of the acoustic phonon is substantially maintained to supply the first and second pulse lights to the optical fiber, a detector for detecting a scattering gain spectrum of a Brillouin-scattered light created in the optical fiber by the second pulse light at time intervals corresponding to twice the time obtained by equally dividing the pulse width of the second pulse light, and a calculator for calculating a distortion and/or a temperature based on the respective scattering gain spectra at the respective time intervals for small sections of the optical fiber corresponding to the respective scattering gain spectra at the respective time intervals.

In the above distribution optical fiber sensor system, the detector may be provided with an optical coupler for multiplexing a light of a specified frequency and the Brillouin-scattered light from the optical fiber; a light receiver for receiving and photoelectrically converting a light outputted from the optical coupler; an oscillator for oscillating an electrical signal of a specified frequency; a mixer for multiplexing an output of the light receiver and an output of the oscillator; a band-pass filter for passing an output of the mixer within a specified frequency band; a buffer for saving an output of the band-pass filter; and a controller for sweeping a specified frequency of the oscillator within such a range where the scattering gain spectra can be obtained. Further, in such a distribution optical fiber sensor system, the detector may be further provided with an interpolating device for interpolating data between two outputs using the two outputs of the band-pass filter saved in the buffer.

Further, in the above distribution optical fiber sensor system, the detector includes an optical coupler for multiplexing a light of a specified frequency and the Brillouin-scattered light from the optical fiber; a light receiver for receiving and photoelectrically converting a light outputted from the optical coupler; a band-pass filter for passing an output of the light receiver within a specified frequency band; and a time-frequency analyzer for applying a time-frequency analysis to an output of the band-pass filter.

Further, in the above distribution optical fiber sensor system, the detector may be provided with an incidence device for causing a light of a specified frequency to be so incident on the optical fiber as to face the second pulse light; an optical coupler for multiplexing the light of the specified frequency and the Brillouin-scattered light from the optical fiber; a light receiver for receiving and photoelectrically converting a light outputted from the optical coupler; a band-pass filter for passing an output of the light receiver within a specified frequency band; and a controller for sweeping the specified frequency of the light within such a range where the scattering gain spectra can be obtained. In this distribution optical fiber sensor system, the detector may be further provided with a light frequency converter for converting the frequency of the light of the specified frequency to conduct a heterodyne detection. Further, in these distribution optical fiber sensor systems, the light of the specified frequency and the second pulse light interact with each other a plurality of times in the optical fiber. Further, in such a distribution optical fiber sensor system, the calculator further calculates a lateral pressure acting on the object to be measured based on the respective scattering gain spectra at the respective time intervals for the respective small sections of the optical fiber corresponding to the respective scattering gain spectra at the respective time intervals.

Further, in the above distribution optical fiber sensor system, the detector may be provided with a first optical coupler for distributing a light of a specified frequency into two lights; an optical switch for passing or shutting off one of the lights distributed in the first optical coupler; a second optical coupler for multiplexing a light from the optical switch and a Brillouin-scattered light from the optical fiber, distributing the multiplexed light into two lights, and causing one of the distributed lights to be incident on the optical fiber; a third optical coupler for multiplexing the other of the lights distributed in the first optical coupler and the other of the lights distributed in the second light coupler; a light receiver for receiving and photoelectrically converting a light outputted from the third optical coupler; a band-pass filter for transmitting an output of the light receiver within a specified frequency band; and a time-frequency analyzer for applying a time-frequency analysis to an output of the band-pass filter.

Since the above distribution optical fiber sensor systems cause the propagation of the second pulse light for creating the Brillouin-scattered light for measurement after causing the propagation of the first pulse light, no transient phenomenon occurs in the Brillouin-scattered light for measurement. Therefore, the distortion and the temperature can be more precisely measured than before.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

The invention claimed is:

1. A distribution optical fiber sensor system, comprising:
   an optical fiber for sensing to be placed on an object to be measured,
   a light source for emitting a first pulse light having a pulse width longer than a transient response of an acoustic phonon and emitting a second pulse light in succession to the first pulse after a time interval during which the vibration of the acoustic phonon is substantially maintained to supply the first and second pulse lights to the optical fiber,
   a detector for detecting a scattering gain spectrum of a Brillouin-scattered light created in the optical fiber by the second pulse light at time intervals corresponding to twice the time obtained by equally dividing the pulse width of the second pulse light, and
   a calculator for calculating a distortion and/or a temperature based on the respective scattering gain spectra at the respective time intervals for small sections of the optical fiber corresponding to the respective scattering gain spectra at the respective time intervals.

2. A distribution optical fiber sensor system according to claim 1, wherein the detector includes:
   an optical coupler for multiplexing a light of a specified frequency and the Brillouin-scattered light from the optical fiber,
   a light receiver for receiving and photoelectrically converting a light outputted from the optical coupler,
   an oscillator for oscillating an electrical signal of a specified frequency,
   a mixer for multiplexing an output of the light receiver and an output of the oscillator,
   a band-pass filter for passing an output of the mixer within a specified frequency band,
   a buffer for saving an output of the band-pass filter, and
   a controller for sweeping a specified frequency of the oscillator within such a range where the scattering gain spectra can be obtained.

3. A distribution optical fiber sensor system according to claim 2, wherein the detector further includes an interpolating device for interpolating data between two outputs using the two outputs of the band-pass filter saved in the buffer.

4. A distribution optical fiber sensor system according to claim 1, wherein the detector includes:
   an optical coupler for multiplexing a light of a specified frequency and the Brillouin-scattered light from the optical fiber,
   a light receiver for receiving and photoelectrically converting a light outputted from the optical coupler,
   a band-pass filter for passing an output of the light receiver within a specified frequency band, and
   a time-frequency analyzer for applying a time-frequency analysis to an output of the band-pass filter.

5. A distribution optical fiber sensor system according to claim 1, wherein the detector includes:
   an incidence device for causing a light of a specified frequency to be so incident on the optical fiber as to face the second pulse light,
   an optical coupler for multiplexing the light of the specified frequency and the Brillouin-scattered light from the optical fiber,
   a light receiver for receiving and photoelectrically converting a light outputted from the optical coupler,
   a band-pass filter for passing an output of the light receiver within a specified frequency band, and
   a controller for sweeping the specified frequency of the light within such a range where the scattering gain spectra can be obtained.

6. A distribution optical fiber sensor system according to claim 5, wherein the detector further includes a light frequency converter for converting the frequency of the light of the specified frequency to conduct a heterodyne detection.

7. A distribution optical fiber sensor system according to claim 5, wherein the light of the specified frequency and the second pulse light interact with each other a plurality of times in the optical fiber.

8. A distribution optical fiber sensor system according to claim 7, wherein the calculator further calculates a lateral pressure acting on the object to be measured based on the respective scattering gain spectra at the respective time intervals for the respective small sections of the optical fiber corresponding to the respective scattering gain spectra at the respective time intervals.

9. A distribution optical fiber sensor system according to claim 1, wherein the detector includes:
   a first optical coupler for distributing a light of a specified frequency into two lights,
   an optical switch for passing or shutting off one of the lights distributed in the first optical coupler,
   a second optical coupler for multiplexing a light from the optical switch and a Brillouin-scattered light from the optical fiber, distributing the multiplexed light into two lights, and causing one of the distributed lights to be incident on the optical fiber,
   a third optical coupler for multiplexing the other of the lights distributed in the first optical coupler and the other of the lights distributed in the second light coupler,
   a light receiver for receiving and photoelectrically converting a light outputted from the third optical coupler,
   a band-pass filter for transmitting an output of the light receiver within a specified frequency band, and
   a time-frequency analyzer for applying a time-frequency analysis to an output of the band-pass filter.

* * * * *